United States Patent
Presz, Jr. et al.

(10) Patent No.: US 7,976,269 B2
(45) Date of Patent: *Jul. 12, 2011

(54) WIND TURBINE WITH MIXERS AND EJECTORS

(75) Inventors: Walter M. Presz, Jr., Wilbraham, MA (US); Michael J. Werle, West Hartford, CT (US)

(73) Assignee: FloDesign Wind Turbine Corp., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/565,027

(22) Filed: Sep. 23, 2009

(65) Prior Publication Data

US 2010/0068029 A1      Mar. 18, 2010

Related U.S. Application Data

(63) Continuation of application No. 12/054,050, filed on Mar. 24, 2008.

(60) Provisional application No. 60/919,588, filed on Mar. 23, 2007.

(51) Int. Cl.
  *F03D 1/04* (2006.01)
(52) U.S. Cl. ........................................... 415/4.3
(58) Field of Classification Search ............ 290/44, 290/55; 415/2.1, 4.1, 4.3, 4.5, 227
  See application file for complete search history.

(56) References Cited

U.S. PATENT DOCUMENTS

| | | |
|---|---|---|
| 1,312,021 A | 8/1919 | Dickinson et al. |
| 3,986,787 A | 10/1976 | Mouton, Jr. et al. |
| 4,021,135 A | 5/1977 | Pedersen et al. |
| 4,038,848 A | 8/1977 | Ichiryu et al. |
| 4,075,500 A | 2/1978 | Oman et al. |
| 4,077,206 A | 3/1978 | Ayyagari |
| 4,140,433 A | 2/1979 | Eckel |

(Continued)

FOREIGN PATENT DOCUMENTS

DE      101 45 786      10/2003

(Continued)

OTHER PUBLICATIONS

JP 61-043276 A. English Translation. Schreiber Translations, Inc. Nov. 2010. pp. 1-21.*

(Continued)

*Primary Examiner* — Richard Edgar
(74) *Attorney, Agent, or Firm* — Richard M. Klein; Fay Sharpe LLP

(57) ABSTRACT

A Mixer/Ejector Wind Turbine ("MEWT") system is disclosed which routinely exceeds the efficiencies of prior wind turbines. Unique ejector concepts are used to fluid-dynamically improve many operational characteristics of conventional wind/water turbines for potential power generation improvements of 50% and above. Applicants' preferred MEWT embodiment comprises: an aerodynamically contoured turbine shroud with an inlet; a ring of stator vanes; a ring of rotating blades (i.e., an impeller) in line with the stator vanes; and a mixer/ejector pump to increase the flow volume through the turbine while rapidly mixing the low energy turbine exit flow with high energy bypass wind flow. The MEWT can produce three or more time the power of its un-shrouded counterparts for the same frontal area, and can increase the productivity of wind farms by a factor of two or more. The same MEWT is safer and quieter providing improved wind turbine options for populated areas.

17 Claims, 20 Drawing Sheets

U.S. PATENT DOCUMENTS

| | | | |
|---|---|---|---|
| 4,166,596 A | 9/1979 | Mouton, Jr. et al. |
| 4,204,799 A | 5/1980 | De Geus |
| 4,218,175 A | 8/1980 | Carpenter |
| 4,320,304 A | 3/1982 | Karlsson et al. |
| 4,324,985 A | 4/1982 | Oman |
| 4,379,236 A | 4/1983 | Inoue |
| 4,482,290 A | 11/1984 | Foreman et al. |
| 4,516,907 A | 5/1985 | Edwards |
| 4,720,640 A | 1/1988 | Anderson et al. |
| 4,781,522 A | 11/1988 | Wolfram |
| 4,786,016 A | 11/1988 | Presz, Jr. et al. |
| 5,083,899 A | 1/1992 | Koch |
| 5,110,560 A | 5/1992 | Presz, Jr. et al. |
| 5,213,138 A | 5/1993 | Presz, Jr. |
| 5,230,369 A | 7/1993 | Presz, Jr. |
| 5,230,656 A | 7/1993 | Paterson et al. |
| 5,327,940 A | 7/1994 | Presz, Jr. |
| 5,440,875 A | 8/1995 | Torkelson et al. |
| 5,447,412 A | 9/1995 | Lamont |
| 5,464,320 A | 11/1995 | Finney |
| 5,506,453 A | 4/1996 | McCombs |
| 5,554,472 A | 9/1996 | Aizawa |
| 5,761,900 A | 6/1998 | Presz, Jr. |
| 5,836,738 A | 11/1998 | Finney |
| 5,884,472 A | 3/1999 | Presz, Jr. |
| 5,947,678 A | 9/1999 | Bergstein |
| 5,992,140 A | 11/1999 | Hammond et al. |
| 6,016,651 A | 1/2000 | Hammond et al. |
| 6,082,635 A | 7/2000 | Seiner et al. |
| 6,127,739 A | 10/2000 | Appa |
| 6,233,920 B1 | 5/2001 | Presz, Jr. et al. |
| 6,276,127 B1 | 8/2001 | Alberti |
| 6,278,197 B1 | 8/2001 | Appa |
| 6,311,928 B1 | 11/2001 | Presz, Jr. et al. |
| 6,382,904 B1 | 5/2002 | Orlov et al. |
| 6,659,719 B2 * | 12/2003 | Angelis ........................ 415/211.2 |
| 6,665,907 B1 | 12/2003 | Lu |
| 6,854,260 B2 | 2/2005 | Anderson |
| 6,877,960 B1 | 4/2005 | Presz, Jr. et al. |
| 6,887,031 B1 | 5/2005 | Tocher |
| 7,017,331 B2 | 3/2006 | Anderson |
| 7,111,448 B2 | 9/2006 | Anderson |
| 7,144,216 B2 | 12/2006 | Hessel |
| 7,218,011 B2 | 5/2007 | Hiel et al. |
| 7,220,096 B2 | 5/2007 | Tocher |
| 7,251,927 B2 | 8/2007 | Anderson |
| 7,256,512 B1 | 8/2007 | Marquiss |
| 7,270,043 B2 | 9/2007 | Presz, Jr. et al. |
| 2004/0005226 A1 | 1/2004 | Smith, III |
| 2006/0151633 A1 | 7/2006 | Presz, Jr. et al. |

FOREIGN PATENT DOCUMENTS

| | | |
|---|---|---|
| JP | 61043276 A * | 3/1986 |
| WO | WO03081031 | 2/2003 |
| WO | WO2004/099607 | 11/2004 |

OTHER PUBLICATIONS

Igra, Ozer, "Research and Development for Shrouded Wind Turbines", *Energy Cons. & Management*, 1981, pp. 13-48, vol. 21.

Igra, Ozer, "Shrouds for Aerogenerators", *AIAA Journal*, Oct. 1976, pp. 1481-1483, vol. 14, No. 10.

Werle at al., "Ducted Wind/Water Turbines and Propellers Revisited", Article designed and produced by FloDesign, Inc., Wilbraham, MA.

Hansen et al., "Effect of Placing a Diffuser Around a Wind Turbine", *Wind Energy*, 2000, pp. 3:207-213.

Windtamer™, Home Wind Power & Energy homepage: www.windtamerturbines.com, Jun. 17, 2010, 3 pages, Genesco, NY.

RU 2147693, English Translation, FLS, Inc., Aug. 2010, pp. 1-16.

* cited by examiner

WIND TURBINE WITH MIXERS AND EJECTORS

RELATED APPLICATION

This application is a continuation of U.S. patent application Ser. No. 12/054,050, filed Mar. 24, 2008. That application claims priority from Applicants' U.S. Provisional Patent Application Ser. No. 60/919,588, filed Mar. 23, 2007 (hereinafter "Applicants' Provisional Application"). Applicants hereby incorporate the disclosure of both applications by reference in their entirety.

FIELD OF INVENTION

The present invention deals generally with axial flow turbines. More particularly, it deals with axial flow wind turbines.

BACKGROUND OF INVENTION

Improvements in the technology of electrical power generation by wind and current-based water turbines are being sought throughout the world as part of the effort to reduce dependency on fossil fuels. The European Union has just announced a major sustainable energy project that includes significant use of wind power and is requesting the US to join this effort.

To fully achieve the ultimate potential of such systems, several problems/limitations need to be addressed. First, the family of existing wind/water turbines share a litany of troublesome limitations including:

(1) Poor performance at low wind speeds, which is most relevant because a majority of the "good-wind" sites have been taken up and the industry has had to begin focusing on technologies for "small wind" sites, (2) Safety concerns due to poor containment for damaged propellers and shielding of rotating parts, (3) Irritating pulsating noise that can reach far from the source, (4) Significant bird strikes and kills, (5) Significant first and recurring costs due to:
  (i) expensive internal gearing, and
  (ii) expensive turbine blade replacements caused by high winds and wind gusts, plus (6) Poor and/or unacceptable esthetics for urban and suburban settings.

The underlying cause for the problems and limitations listed above is that the vast majority of existing wind/water turbine systems depend on the same design methodology. As a result, virtually all existing wind turbines are unshrouded/unducted, have only a few blades (which tend to be very long, thin and structurally vulnerable) and rotate at very low blade-hub speeds (thus requiring extensive internal gearing for electricity production) but have very high blade-tip speeds (with its attendant complications). These are all similar because they are all based on the same aerodynamic model that attempts to capture the maximum amount of the power available in the wind utilizing the "Betz Theory" for wind turbines (circa 1926) with Schmitz corrections for flow swirl effects, aerodynamic profile losses and tip flow losses. This theory sets the current family of designs and leaves very little room for improving the aerodynamic performance. Thus industry's efforts have primarily become focused on all other non-aerodynamic aspects of the wind turbine, such as, production and life costs, structural integrity, etc.

Wind turbines usually contain a propeller-like device, termed the "rotor", which is faced into a moving air stream. As the air hits the rotor, the air produces a force on the rotor in such a manner as to cause the rotor to rotate about its center. The rotor is connected to either an electricity generator or mechanical device through linkages such as gears, belts, chains or other means. Such turbines are used for generating electricity and powering batteries. They are also used to drive rotating pumps and/or moving machine parts. It is very common to find wind turbines in large electricity generating "wind farms" containing multiple such turbines in a geometric pattern designed to allow maximum power extraction with minimal impact of each such turbine on one another and/or the surrounding environment.

The ability of a rotor to convert fluid power to rotating power, when placed in a stream of very large width compared to its diameter, is limited by the well documented theoretical value of 59.3% of the oncoming stream's power, known as the "Betz" limit as documented by A. Betz in 1926. This productivity limit applies especially to the traditional multi-bladed axial wind/water turbine presented in FIG. 1, labeled Prior Art.

Attempts have been made to try to increase wind turbine performance potential beyond the "Betz" limit. Shrouds or ducts surrounding the rotor have been used. See, e.g., U.S. Pat. No. 7,218,011 to Hiel et al. (see FIG. 35); U.S. Pat. No. 4,204,799 to de Geus (see FIG. 36); U.S. Pat. No. 4,075,500 to Oman et al. (see FIG. 37); and U.S. Pat. No. 6,887,031 to Tocher. Properly designed shrouds cause the oncoming flow to speed up as it is concentrated into the center of the duct. In general, for a properly designed rotor, this increased flow speed causes more force on the rotor and subsequently higher levels of power extraction. Often though, the rotor blades break apart due to the shear and tensile forces involved with higher winds.

Values two times the Betz limit allegedly have been recorded but not sustained. See Igar, O., Shrouds for Aerogenerators, AIAA Journal, October 1976, pp. 1481-83; Igar & Ozer, Research and Development for Shrouded Wind Turbines, Energy Cons. & Management, Vol. 21, pp. 13-48, 1981; and see the AIAA Technical Note, entitled "Ducted Wind/Water Turbines and Propellers Revisited", authored by Applicants ("Applicants' AIAA Technical Note"), and accepted for publication. Copies can be found in Applicants' Information Disclosure Statement. Such claims however have not been sustained in practice and existing test results have not confirmed the feasibility of such gains in real wind turbine application.

To achieve such increased power and efficiency, it is necessary to closely coordinate the aerodynamic designs of the shroud and rotor with the sometimes highly variable incoming fluid stream velocity levels. Such aerodynamic design considerations also play a significant role on the subsequent impact of flow turbines on their surroundings, and the productivity level of wind farm designs.

In an attempt to advance the state of the art, ducted (also known as shrouded) concepts have long been pursued. These have consistently provided tantalizing evidence that they may offer significant benefits over those of traditional unducted design. However, as yet, none have been successful enough to have entered the marketplace. This is apparently due to three major weaknesses of current designs: (a) they generally employ propeller based aerodynamic concepts versus turbine aerodynamic concepts, (b) they do not employ concepts for noise and flow improvements, and (c) they lack a first principles based ducted wind/water turbine design methodology equivalent to the "Betz/Schmitz Theory" that has been used extensively for unducted configurations.

Ejectors are well known and documented fluid jet pumps that draw flow into a system and thereby increase the flow rate through that system. Mixer/ejectors are short compact versions of such jet pumps that are relatively insensitive to incoming flow conditions and have been used extensively in high speed jet propulsion applications involving flow velocities near or above the speed of sound. See, for example, U.S. Pat. No. 5,761,900 by Dr. Walter M. Presz, Jr, which also uses a mixer downstream to increase thrust while reducing noise from the discharge. Dr. Presz is a co-inventor in the present application.

Gas turbine technology has yet to be applied successfully to axial flow wind turbines. There are multiple reasons for this shortcoming. Existing wind turbines use non-shrouded turbine blades to extract the wind energy. As a result, a significant amount of the flow approaching the wind turbine blades flows around and not through the blades. Also, the air velocity decreases significantly as it approaches existing wind turbines. Both of these effects result in low flow through, turbine velocities. These low velocities minimize the potential benefits of gas turbine technology such as stator/rotor concepts. Previous shrouded wind turbine approaches have keyed on exit diffusers to increase turbine blade velocities. Diffusers require long lengths for good performance, and tend to be very sensitive to oncoming flow variations. Such long, flow sensitive diffusers are not practical in wind turbine installations. Short diffusers stall, and just do not work in real applications. Also, the downstream diffusion needed may not be possible with the turbine energy extraction desired at the accelerated velocities. These effects have doomed all previous attempts at more efficient wind turbines using gas turbine technology.

Accordingly, it is a primary object of the present invention to provide an axial flow wind turbine that employs advanced fluid dynamic mixer/ejector pump principles to consistently deliver levels of power well above the Betz limit.

It is another primary object to provide an improved axial flow wind turbine that employs unique flow mixing (for wind turbines) and control devices to increase productivity of and minimize the impact of its attendant flow field on the surrounding environment located in its near vicinity, such as found in wind farms.

It is another primary object to provide an improved axial flow wind turbine that pumps in more flow through the rotor and then rapidly mixes the low energy turbine exit flow with high energy bypass wind flow before exiting the system.

It is a more specific object, commensurate with the above-listed objects, which is relatively quiet and safer to use in populated areas.

SUMMARY OF INVENTION

A mixer/ejector wind turbine system (nicknamed the "MEWT") for generating power is disclosed that combines fluid dynamic ejector concepts, advanced flow mixing and control devices, and an adjustable power turbine.

In the preferred embodiment, the MEWT is an axial flow turbine comprising, in order going downstream: an aerodynamically contoured turbine shroud having an inlet; a ring of stators within the shroud; an impeller having a ring of impeller blades "in line" with the stators; a mixer, attached to the turbine shroud, having a ring of mixing lobes extending downstream beyond the impeller blades; and an ejector comprising the ring of mixing lobes (e.g., like that shown in U.S. Pat. No. 5,761,900) and a mixing shroud extending downstream beyond the mixing lobes. The turbine shroud, mixer and ejector are designed and arranged to draw the maximum amount of fluid through the turbine and to minimize impact to the environment (e.g., noise) and other power turbines in its wake (e.g., structural or productivity losses). Unlike the prior art, the preferred MEWT contains a shroud with advanced flow mixing and control devices such as lobed or slotted mixers and/or one or more ejector pumps. The mixer/ejector pump presented is much different than used in the aircraft industry since the high energy air flows into the ejector inlets, and outwardly surrounds, pumps and mixes with the low energy air exiting the turbine shroud.

In this first preferred embodiment, the MEWT comprises: an axial flow wind turbine surrounded by an aerodynamically contoured turbine shroud incorporating mixing devices in its terminus region (i.e., an end portion of the turbine shroud) and a separate ejector duct overlapping but aft of said turbine shroud, which itself may incorporate advanced mixing devices in its terminus region.

In an alternate embodiment, the MEWT comprises: an axial flow wind turbine surrounded by an aerodynamically contoured turbine shroud incorporating mixing devices in its terminus region.

First-principles-based theoretical analysis of the preferred MEWT indicates that the MEWT can produce three or more time the power of its un-shrouded counterparts for the same frontal area, and increase the productivity of wind farms by a factor of two or more.

Applicants believe, based upon their theoretical analysis, that the preferred MEWT embodiment will generate three times the existing power of the same size conventional wind turbine.

Other objects and advantages of the current invention will become more readily apparent when the following written description is read in conjunction with the accompanying drawings.

DETAILED DESCRIPTION OF PREFERRED EMBODIMENTS

Figure 27:
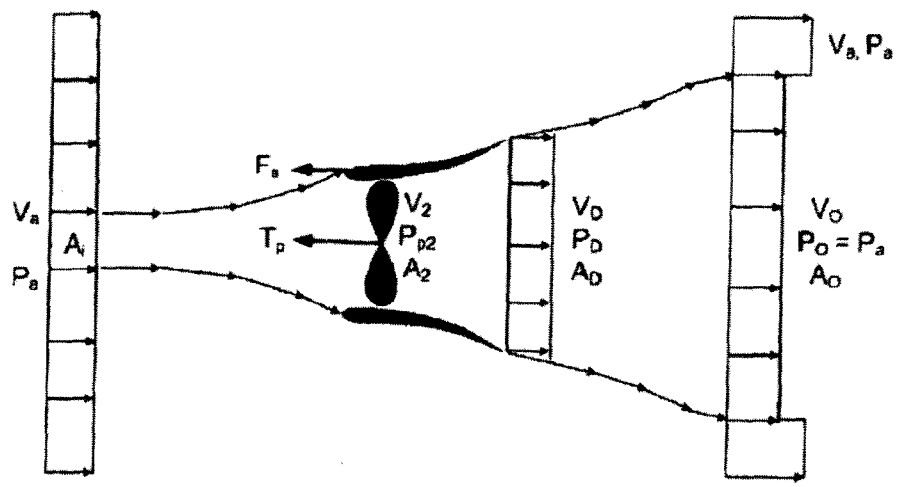
FIG. 27 shows the geometry and nomenclature used in a ducted power system.

In a one-dimensional actuator disc model, the turbine or propeller's effect is taken as a discontinuous extraction or addition of power. FIG. 27 provides the geometry and nomenclature for the more general ducted case. The unducted case is recovered when the duct size and the attendant force $F_s$ are allowed to shrink to zero. Using a control volume analysis that includes the turbine/propeller blade as a discontinuity as well as the inflows and outflows at upstream and downstream infinity, the conservation of mass, momentum and energy for a low speed and/or incompressible fluid leads to the equations for power and thrust as:

Power $$P = \frac{1}{4}\rho A_p(V_o^2 - V_a^2)(V_o + V_a)$$ Equation (1)

Thrust $$T = 2P/(V_o + V_a)$$ Equation (2)

The equations are first presented in dimensional form and later non-dimensionalized per their application. As seen, there are four variables, power P, thrust T, free stream velocity, $V_a$ and the downstream core velocity, $V_o$. For wind/water turbines, only forward velocity $V_a$ is known thus another independent equation is required to close the set. This is achieved by seeking the condition for capturing the maximum power, i.e., the value of $V_o$ for which P is maximum. This is easily obtained by setting the differential of Equation 1 to zero, for which one obtains the "Betz" limit as:

Betz Maximum Power Limit $$C_{Pmax} = \frac{P_{max}}{\frac{1}{2}\rho A_p V_a^3} = \frac{16}{27}$$ Equation (3)

Figure 28:
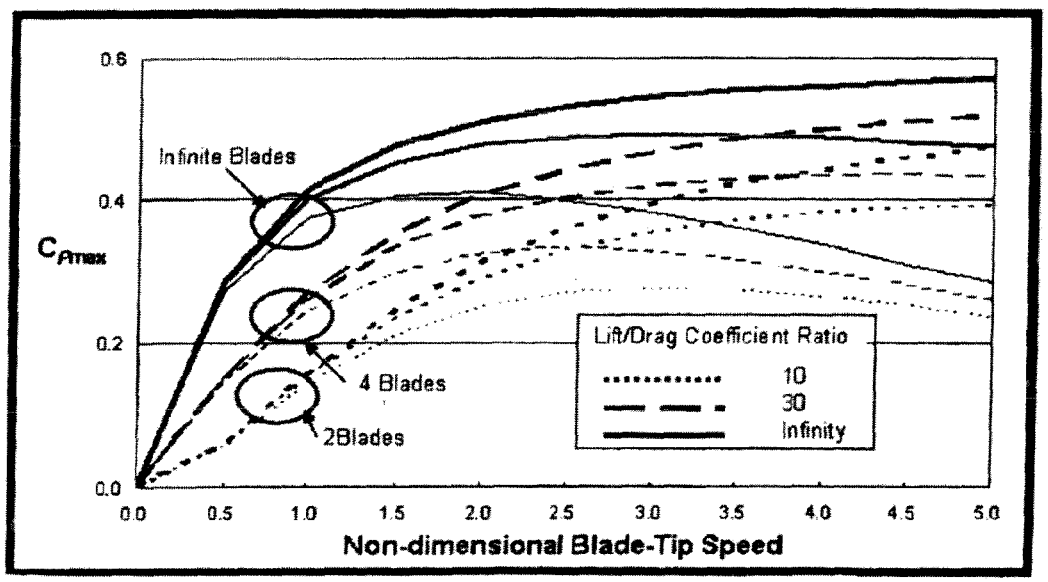
FIG. 28 is a graph showing the Schmitz corrections for an unducted turbine.

This result is of fundamental importance to wind/water turbine design. It is used as a core element in the detailed aerodynamic design of the cross sectional shape of the turbine blade along its radius so as to guarantee the capture of the maximum power available from the total flow passing over the blade. An additional adjustment is made to the blade designs in order to account for the reduction of the captured power due to residual swirl in the flow aft of the blade, blade tip losses, and aerodynamic profile losses—all of which are referred to as the Schmitz corrections. These loss effects are reproduced here in FIG. 28 in order to highlight an important fact—to capture anywhere near the Betz power extraction limit, the turbine blades must either have numerous blades or rotate with high tip speeds, have high aspect ratio, and have high lift to drag coefficients. Virtually all existing turbines, as exemplified by those shown in Prior Art FIG. 1, honor the aerodynamic requirements of this Betz-Schmitz analytical model.

Turning now to the propeller propulsion case, Equation 1 can be written as:

$$V_{op}^3 + V_{op}^2 V_{ap} - V_{op} V_{ap}^2 - 1 = 0$$ Equation (4a)

Here a new power-based characteristic velocity, $V_p$ (this "Power" velocity is closely related to the disk loading coefficient used by others), has been defined as:

$$V_p = (4P/\rho A_p)^{\frac{1}{3}}$$ Equation (4b)

and for convenience, the velocity ratios are written in short-hand fashion as:

$$V_{op} = V_o/V_p$$ Equation (4c)

$$V_a/V_p = V_a/V_p$$ Equation (4d)

The exact solution of Equation 4a is given as:

$$V_{op} = \left[\frac{1}{2} + \frac{8}{27}V_{ap}^3 + \frac{1}{2}\sqrt{\left(1 + \frac{16}{27}V_{ap}^3\right)^2 - \frac{64}{729}V_{ap}^6}\right]^{\frac{1}{3}} + \left[\frac{1}{2} + \frac{8}{27}V_{ap}^3 - \frac{1}{2}\sqrt{\left(1 + \frac{16}{27}V_{ap}^3\right)^2 - \frac{64}{729}V_{ap}^6}\right]^{\frac{1}{3}} - \frac{1}{3}V_{ap}$$ Equation (4e)

which can be approximated using a series expansion for as:

$$V_{op} \approx 1 - \frac{1}{3}V_{ap} + \frac{4}{9}V_{ap}^2$$ Equation (4f)

Figure 29:
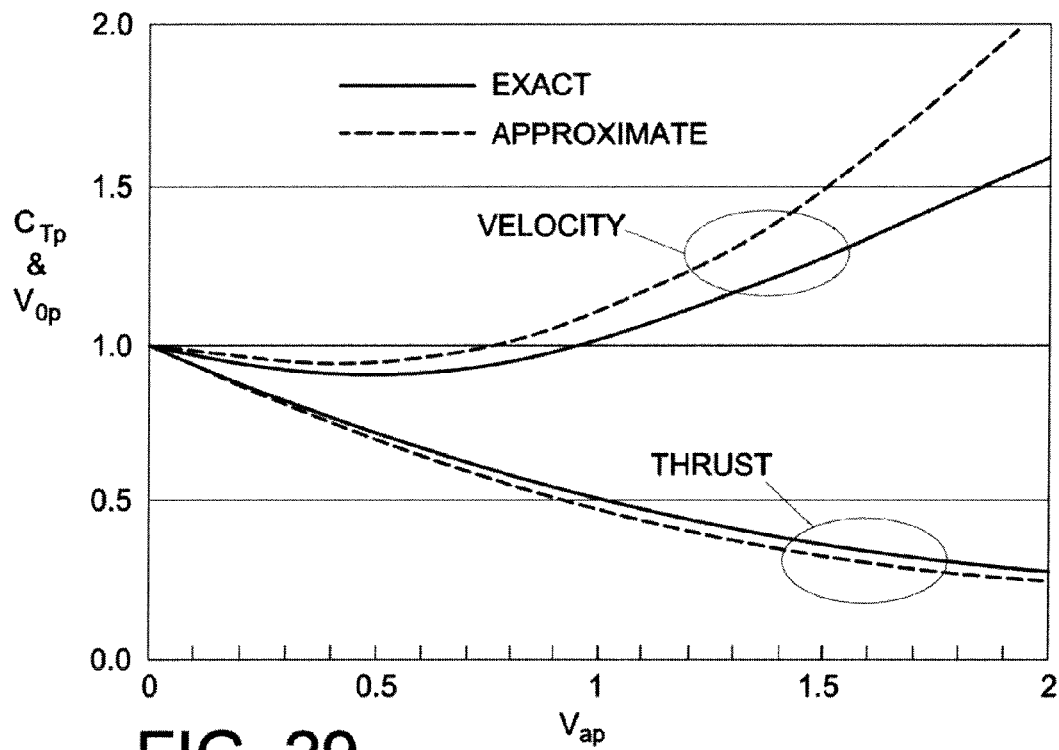
FIG. 29 is a graph showing the degree of correspondence between an approximate solution and an exact solution for an equation.

As shown in FIG. 29, this approximation of Equation 4e holds over a surprisingly wide range of $V_{ap}$. The situation is even better for the propeller thrust, which can now be calculated using either Equation 4(e) or its approximation Equation 4(f) in Equation 2. The results are also presented in FIG. 29 in terms of a propeller thrust coefficient, $C_T$ herein defined as:

$$C_{T_p} \equiv \frac{T}{\frac{1}{2}\rho A_p V_p^2} = 1/(V_{op} + V_{ap})$$ Equation (4g)

Again it is noted from FIG. 29 that use of Equation 4f gives a good representation of the exact solution as:

$$C_{T_p} \approx 1 \bigg/ \left(1 + \frac{2}{3}V_{ap} + \frac{4}{9}V_{ap}^2\right)$$ Equation (4h)

Equations 1 thru 4 give a complete representation for power generating wind/water turbines. It remains now to first generalize these for ducted configurations and then for mixer-ejector configurations.

Extension of the actuator-disc based analytical model presented in Equations 1-4 to ducted configurations is straight forward. Referring again to FIG. 27, the power and thrust equations become:

Power $$P = \frac{1}{4}[\rho A_p (V_o^2 - V_a^2) + F_s](V_o + V_a)$$ Equation (5)

Thrust $$T = 2P/(V_o + V_a)$$ Equation (6)

These equations explicitly retain the shroud/duct force, $F_s$, influence on flow field. The force, $F_s$, is generated in the current inviscid flow model through introduction of circulation about the ring airfoil formed by the shroud/duct.

These equations introduce a flow boundary condition and therein correct previously proposed and used models. In all previous applications of the one-dimensional actuator disc model to ducted wind/water turbines, the equation set was closed by imposing the pressure level as a downstream boundary condition at the duct exit plane, $A_D$.

The significance of this correction is most important for producing the Betz limit-power equivalent for ducted configurations. From Equation 5 it is shown that the maximum power for a ducted wind/water turbine is given as:

Ducted Wind/Water Turbine Power Limit $$C_{P_{max}} = \frac{16}{27}\left[\frac{\sqrt{1 - \frac{3}{4}C_s} + 1 - \frac{3}{2}C_s}{2}\right]\left[\frac{\sqrt{1 - \frac{3}{4}C_s} + 1}{2}\right]$$ Equation (7)

where the nondimensional shroud/duct force coefficient is given as:

$$C_s \equiv \frac{F_s}{\frac{1}{2}\rho A_p V_a^2}$$ Equation (7b)

Figure 30:
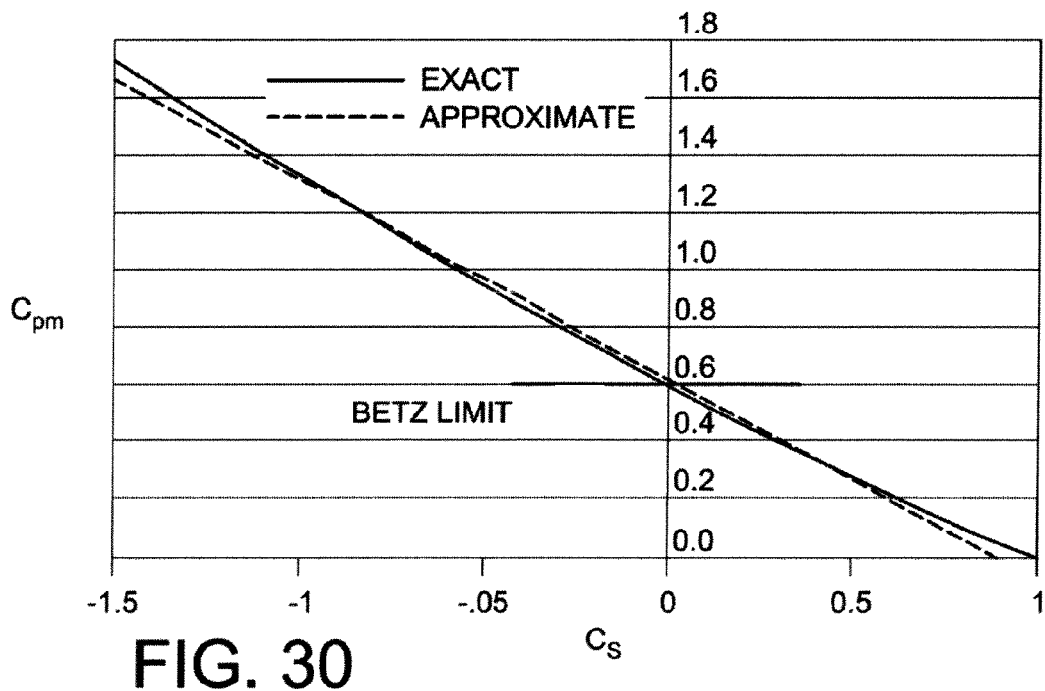
FIG. 30 is a graph showing the degree of correspondence between an approximate solution and an exact solution for an equation of the maximum power for a ducted wind/water turbine.

Note this model captures the unducted case ($C_s=0$) as but one of an infinite family of ducted wind/water turbines, as shown in FIG. 30. Also shown is a Taylor series approximation of Equation 7a given as:

$$C_{P_{max}} = \frac{16}{27}\left[1 - \frac{9}{8}C_s\right]$$ Equation (7c)

which enjoys a surprising wide range of applicability.

Equations 7a-7c provide a missing Betz-like core element for the detailed design of the cross sectional shape of the turbine/propeller blades so as to guarantee the capture of the maximum power available from the flow passing over the blade, as well as the basis for Schmitz-like analysis correcting the results for swirl and aerodynamic profile losses.

Most significantly, it is observed that: (a) ducted props are theoretically capable of capturing many times the power of a bare wind/water turbine and (b) there is but a single parameter, $C_s$, and by association the circulation about the duct, that determines the maximum power that can be extracted from the flow. This now explicit relationship that couples the design of the blades and its surrounding duct must be satisfied in order to achieve optimal power extraction. With this new model in hand, a rational approach to the design of wind/water turbines can proceed with the potential for achieving maximum power output available.

Figure 31:
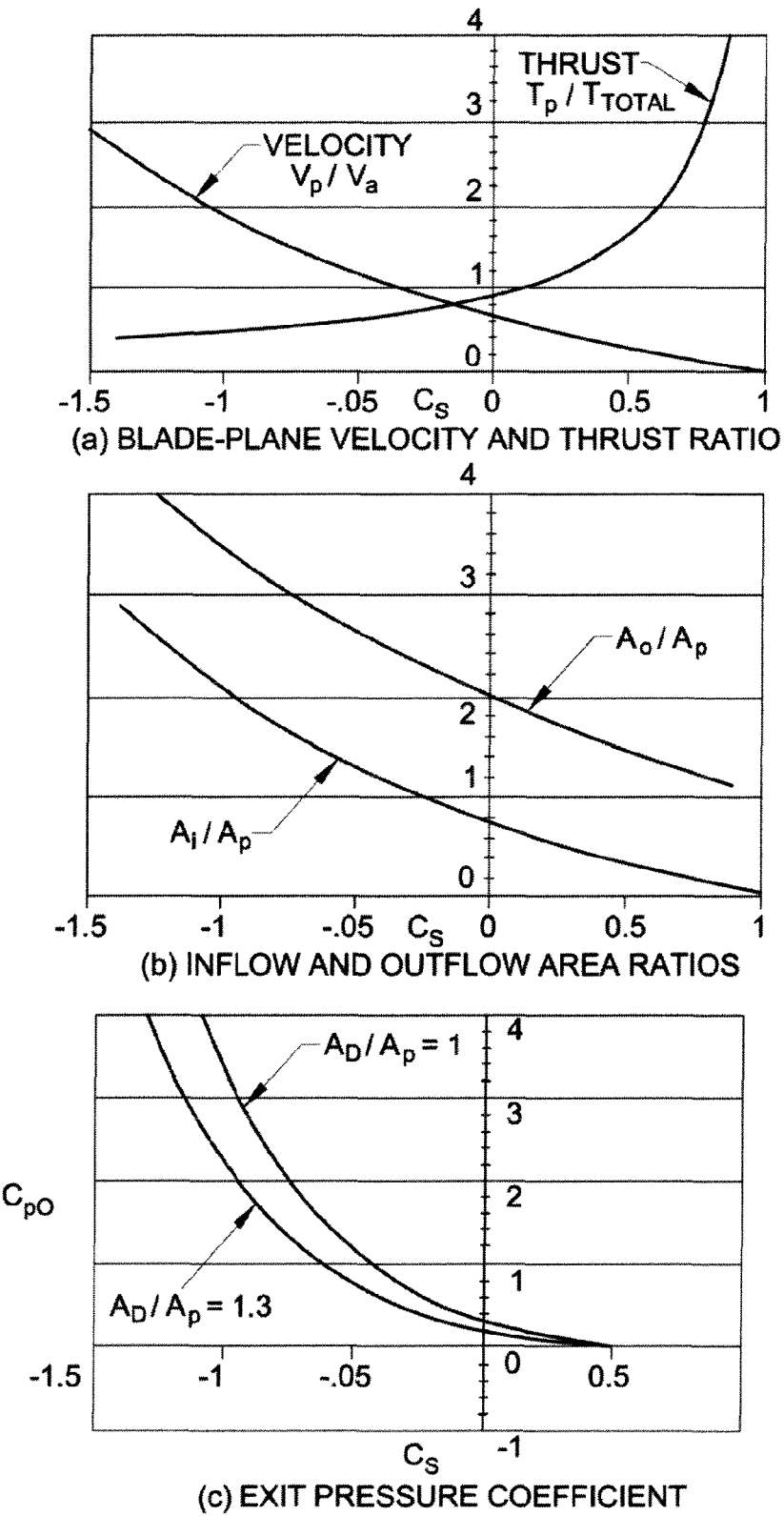
FIGS. 31(a), 31(b), and 31(c) show related results for a ducted wind/water turbine.
Figure 32:
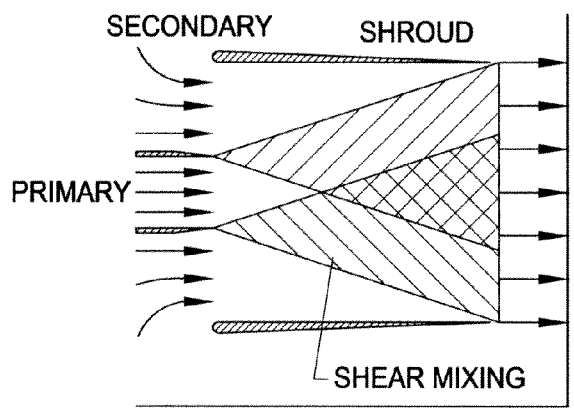
FIGS. 32, 38, 39, and 40 show a basic mixer-ejector system.
Figure 38:
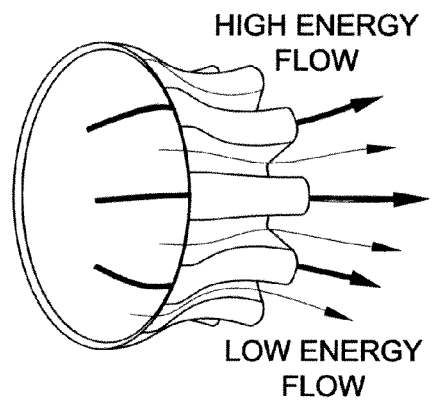
Figure 39:
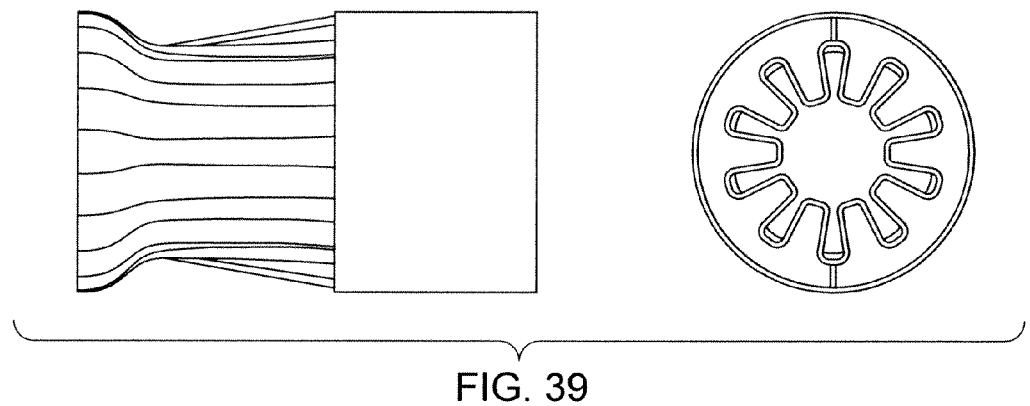
Figure 40:
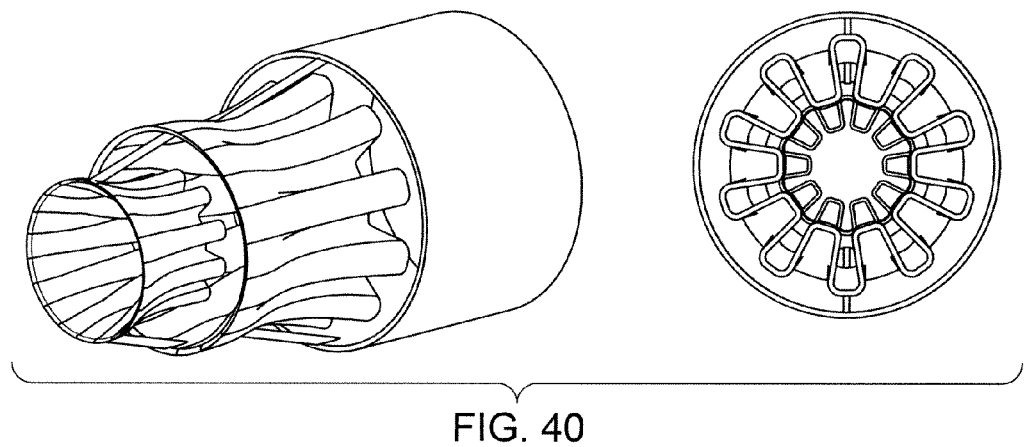

A complete set of related results are presented below and in FIGS. 31(*a*), 31(*b*), and 31(*c*).

$$V_{oa_m} = \frac{1}{3}\left[2\sqrt{1 - \frac{3}{4}C_s} - 1\right]$$ Equation (7d)

$$V_{pa_m} = \frac{1}{2}(V_{oa} + 1) + \frac{\frac{C_s}{2}}{(V_{oa} - 1)}$$ Equation (7e)

$$T_{PT_m} \equiv \left(\frac{T_P}{T_{Total}}\right)_m = 1 - \frac{C_s}{(1 - V_{oa}^2)}$$ Equation (7f)

$$A_{op_m} \equiv \left(\frac{A_o}{A_p}\right)_m = \frac{V_{pa_m}}{V_{oa_m}}$$ Equation (7g)

$$A_{ip_m} \equiv \left(\frac{A_i}{A_p}\right)_m = V_{pa_m}$$ Equation (7h)

Flow conditions at the exit plane, $A_D$, of FIG. 27 can be calculated using Bernoulli's equation to show that in order to achieve maximum power extraction, the duct exit pressure coefficient and exit area diffusion ratio must satisfy the relation:

$$C_{P_D} = \frac{P_a - P_D}{\frac{1}{2}\rho V_a^2} = \frac{(V_P/V_a)^2}{(A_D/A_P)^2} - \left(\frac{V_o}{V_a}\right)^2 \quad \text{Equation (7i)}$$

where the area ratio is given in shorthand fashion as:

$$A_{DP} = A_D/A_P \quad \text{Equation (7j)}$$

and the results are shown in FIG. 31(c) for two duct area diffusion ratios.

Figure 33:
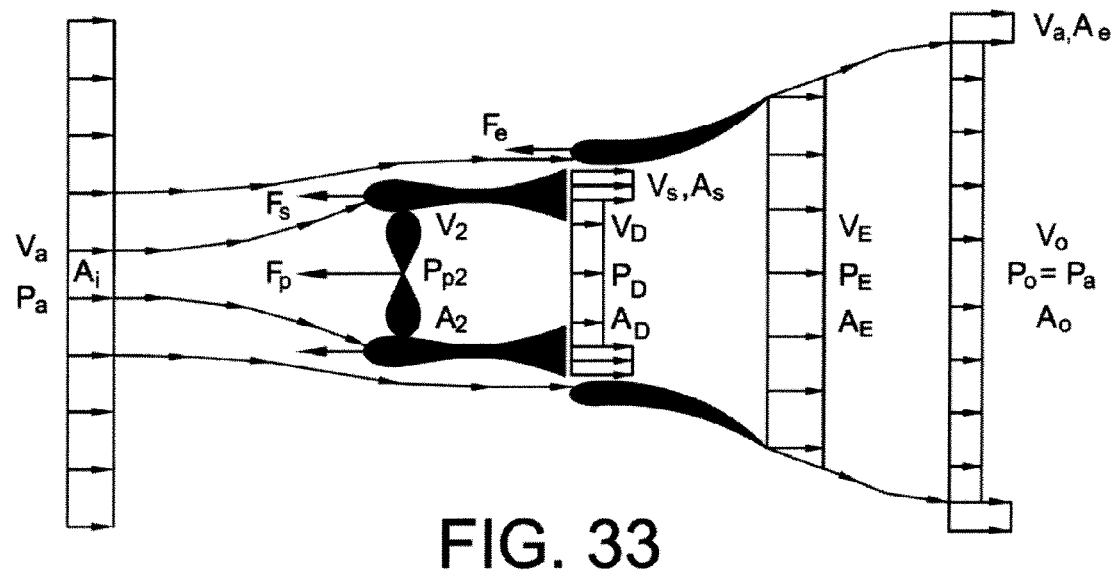
FIG. 33 shows the geometry and nomenclature used in a single-stage mixer-ejector wind/water turbine system.

A sophisticated and unique design system and methodology for single and multi-stage mixer-ejectors can be applied to enhance subsonic ducted power systems. It is necessary to couple the governing equations for the flow through multi-stage mixers to the flow field of the ducted configuration shown in FIG. 27, leading to the flow configuration shown in FIG. 33 for the case of a single stage mixer-ejector wind/water turbine system.

Following the same procedure as for the unducted and ducted cases above, but adding in mass, momentum and energy conservation internal to the ejector duct, the three governing equations are given as:

Power $$P = \frac{1}{2}\rho A_D V_D (V_S^2 - V_D^2) \quad \text{Equation (8)}$$

Overall Momentum Balance $$\frac{1}{2}\rho A_P(V_D^2 - V_S^2) + F_s + F_e = \rho A_D V_D(1 + r_S V_{SD})(V_o - V_a) \quad \text{Equation (9)}$$

where the shroud/duct and ejector force coefficient has been defined as:

$$C_{se} \equiv \frac{F_s + F_e}{\frac{1}{2}\rho V_a^2} \quad \text{Equation (9b)}$$

Ejector Flow $$(V_S + r_S V_D)^2 = (1 + r_S)^2 [V_a^2 + V_D^2 - V_o^2] \quad \text{Equation (10a)}$$

where the ejector inlet area parameter $r_s$ has been defined as:

$$r_s = A_S/A_D \quad \text{Equation (10b)}$$

For the wind/water turbine case, this system of equations can be used to determine the Betz equivalent maximum power for extraction by a mixer-ejector by differentiating Equation 8, substituting the relevant terms from Equation 9 and Equation 10a, setting the derivative to zero, and solving iteratively. The results are presented in FIG. 34 in terms of the ratio of extracted power to the bare prop maximum, i.e. the Betz limit:

$$r \equiv C_{P_{max}} / \left(\frac{16}{27}\right) \quad \text{Equation (11)}$$

Figure 34:
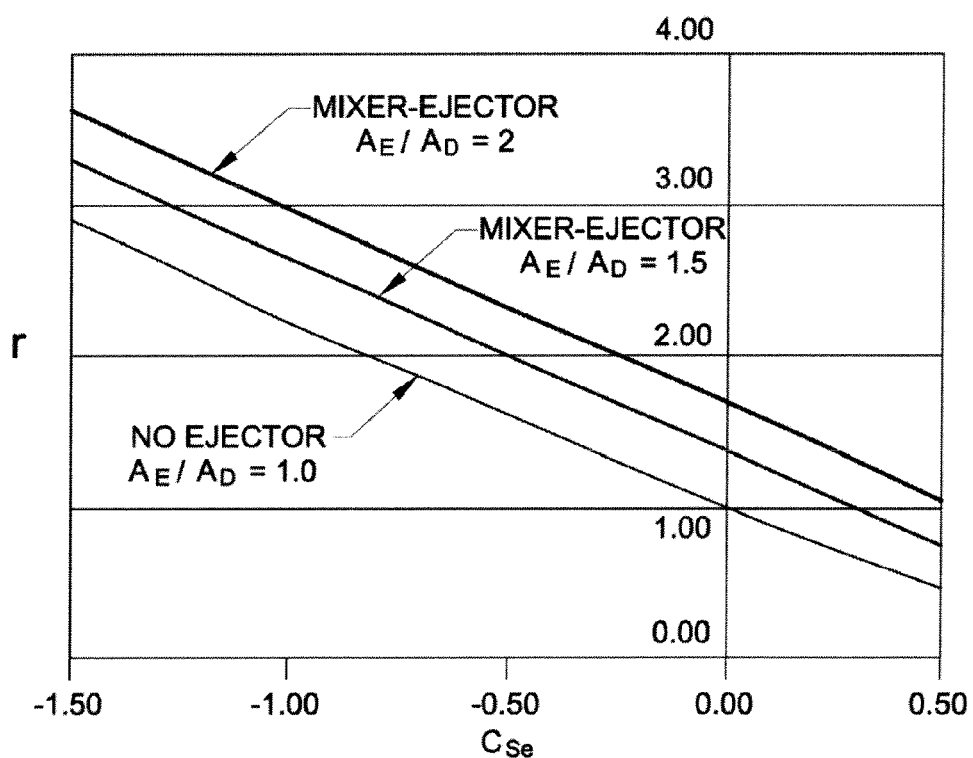
FIG. 34 is a graph showing the predicted Betz equivalent maximum power that can be extracted by a mixer-ejector system, a ducted system, and an unducted system.

It is seen that mixer-ejectors significantly increase the maximum power extraction potential over that of the unducted case ($C_{se}=0$, $A_e/A_D=1$) as well as the ducted case ($0>C_{se}>0$, $A_e/A_D=1$). FIG. 34 indicates that levels of 2 and 3 times the bare turbine case and 70% greater than the ducted case are obtainable.

A Mixer-Ejector Power System (MEPS) provides a unique and improved means of generating power from wind or water currents. A MEPS concept includes:
   a primary duct containing a turbine or propeller blade which extracts or adds power to the primary stream; and
   a single or multiple-stage mixer-ejector to ingest flow with each such mixer/ejector stage including a mixing duct for both bringing in secondary flow and providing flow mixing-length for the ejector stage. The mixing duct inlet contours are designed to minimize flow losses while providing the pressure forces necessary for good ejector performance.

The resulting mixer/ejectors enhances the operational characteristics of the power system by: (a) increasing the amount of flow through the system, (b) reducing the back pressure on the turbine blade, and (c) reducing the noise propagating from the system.

The MEPS may include:
   camber to the duct profiles to enhance the amount of flow into and through the system;
   acoustical treatment in the primary and mixing ducts for noise abatement flow guide vanes in the primary duct for control of flow swirl and/or mixer-lobes tailored to diminish flow swirl effects;
   turbine-like blade aerodynamics designs based on the new theoretical power limits to develop families of short, structurally robust configurations which may have multiple and/or counter-rotating rows of blades;
   exit diffusers or nozzles on the mixing duct to further improve performance of the overall system;
   inlet and outlet areas that are non-circular in cross section to accommodate installation limitations;
   a swivel joint on its lower outer surface for mounting on a vertical stand/pylon allowing for turning the system into the wind or water current;
   vertical aerodynamic stabilizer vanes mounted on the exterior of the ducts with tabs to keep the system pointed into the wind or water current; or
   mixer lobes on a single stage of a multi-stage ejector system.

Referring to the drawings in detail, FIGS. 2-25 show alternate embodiments of Applicants' axial flow Wind Turbine with Mixers and Ejectors ("MEWT").

In the preferred embodiment (see FIGS. 2, 3, 4, 5), the MEWT 100 is an axial flow wind turbine comprising:
   (a) an aerodynamically contoured turbine shroud 102;
   (b) an aerodynamically contoured center body 103 within and attached to the turbine shroud 102;
   (c) a turbine stage 104, surrounding the center body 103, comprising a stator ring 106 of stator vanes (e.g., 108a) and an impeller or rotor 110 having impeller or rotor blades (e.g., 112a) downstream and "in-line" with the stator vanes (i.e., leading edges of the impeller blades are substantially aligned with trailing edges of the stator vanes), in which:
      (i) the stator vanes (e.g., 108a) are mounted on the center body 103;
      (ii) the impeller blades (e.g., 112a) are attached and held together by inner and outer rings or hoops mounted on the center body 103;

(d) a mixer 118 having a ring of mixer lobes (e.g., 120*a*) on a terminus region (i.e., end portion) of the turbine shroud 102, wherein the mixer lobes (e.g., 120*a*) extend downstream beyond the impeller blades (e.g., 12*a*); and (e) an ejector 122 comprising a shroud 128, surrounding the ring of mixer lobes (e.g., 120*a*) on the turbine shroud, with a profile similar to the ejector lobes shown in U.S. Pat. No. 5,761,900, wherein the mixer lobes (e.g., 120*a*) extend downstream and into an inlet 129 of the ejector shroud 128.

Figure 7:
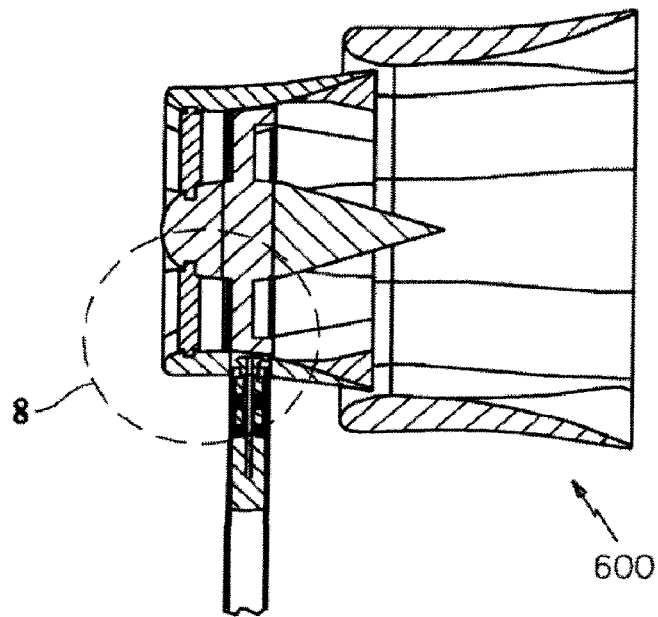
FIG. 7 is a side cross-sectional view of the MEWT of FIG. 6.

The center body 103 MEWT 100, as shown in FIG. 7, is preferably connected to the turbine shroud 102 through the stator ring 106 (or other means) to eliminate the damaging, annoying and long distance propagating low-frequency sound produced by traditional wind turbines as the turbine's blade wakes strike the support tower. The aerodynamic profiles of the turbine shroud 102 and ejector shroud 128 preferably are aerodynamically cambered to increase flow through the turbine rotor.

Applicants have calculated, for optimum efficiency in the preferred embodiment 100, the area ratio of the ejector pump 122, as defined by the ejector shroud 128 exit area over the turbine shroud 102 exit area will be between 1.5 and 3.0. The number of mixer lobes (e.g., 120*a*) would be between 6 and 14. Each lobe will have inner and outer trailing edge angles between 5 and 25 degrees. The primary lobe exit location will be at, or near, the entrance location or inlet 129 of the ejector shroud 128. The height-to-width ratio of the lobe channels will be between 0.5 and 4.5. The mixer penetration will be between 50% and 80%. The center body 103 plug trailing edge angles will be thirty degrees or less. The length to diameter (L/D) of the overall MEWT 100 will be between 0.5 and 1.25.

First-principles-based theoretical analysis of the preferred MEWT 100, performed by Applicants, indicate: the MEWT can produce three or more time the power of its un-shrouded counterparts for the same frontal area; and the MEWT can increase the productivity of wind farms by a factor of two or more. See Applicants' AIAA Technical Note, identified in the Background above, for the methodology and formulae used in their theoretical analysis.

Figure 1:
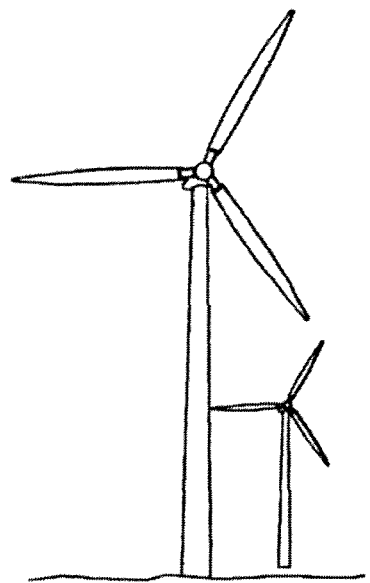
FIGS. 1, 35, 36, and 37, labeled "Prior Art", illustrate examples of prior turbines.
Figure 35:
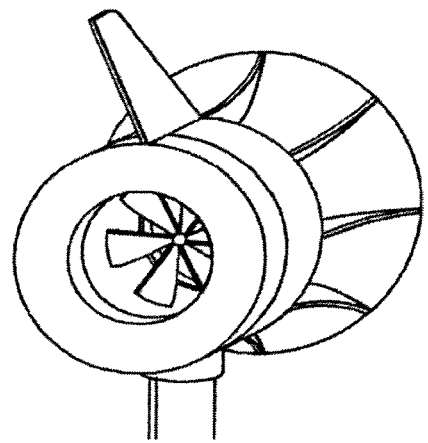
Figure 36:
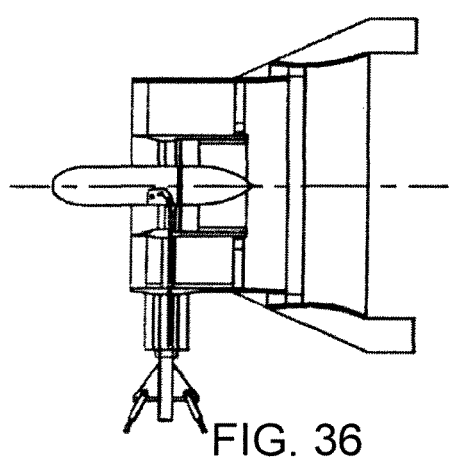
Figure 37:
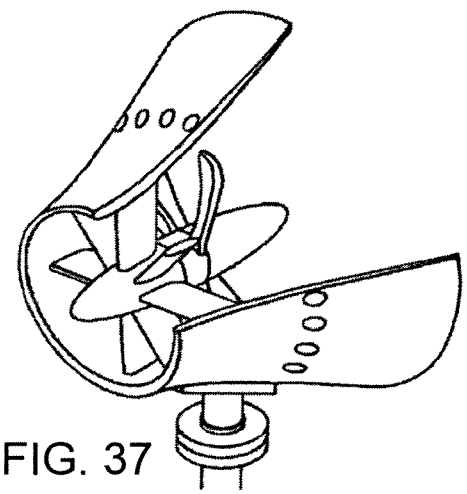
Figure 2:
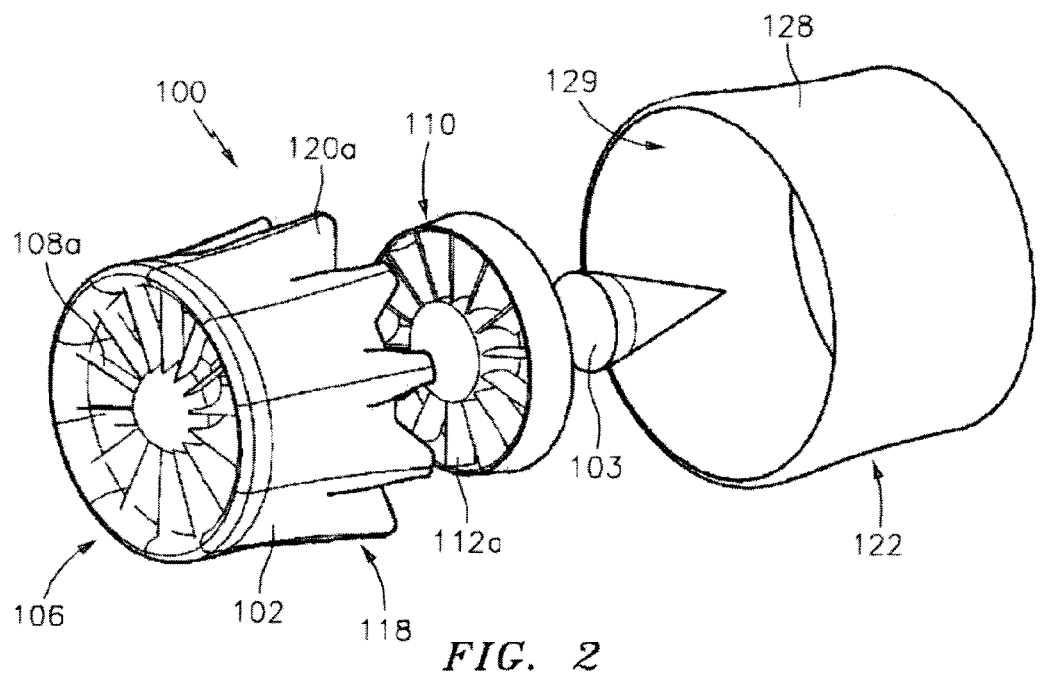
FIG. 2 is an exploded view of Applicants' preferred MEWT embodiment, constructed in accordance with the present invention.
Figure 3:
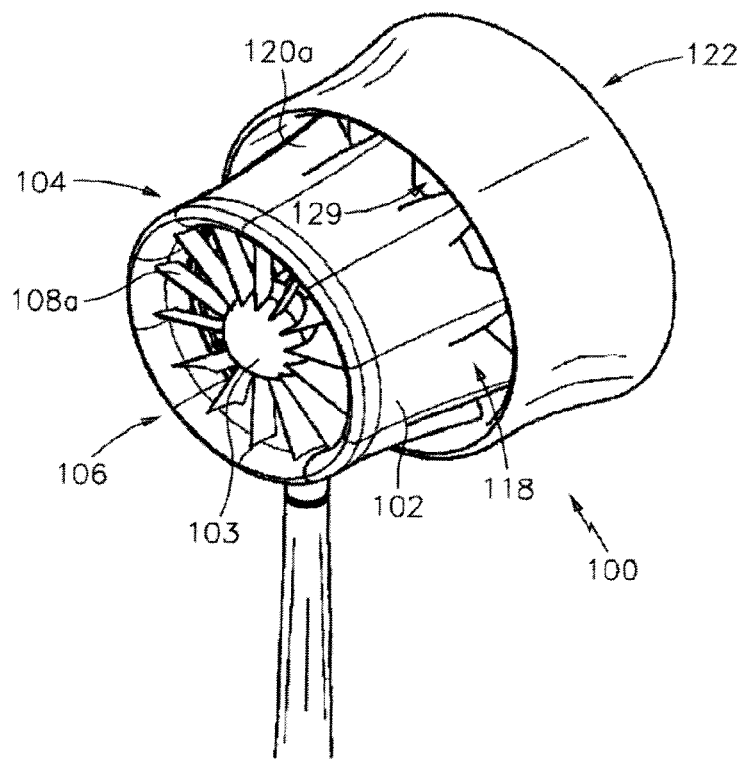
FIG. 3 is a front perspective view of the preferred MEWT attached to a support tower.
Figure 4:
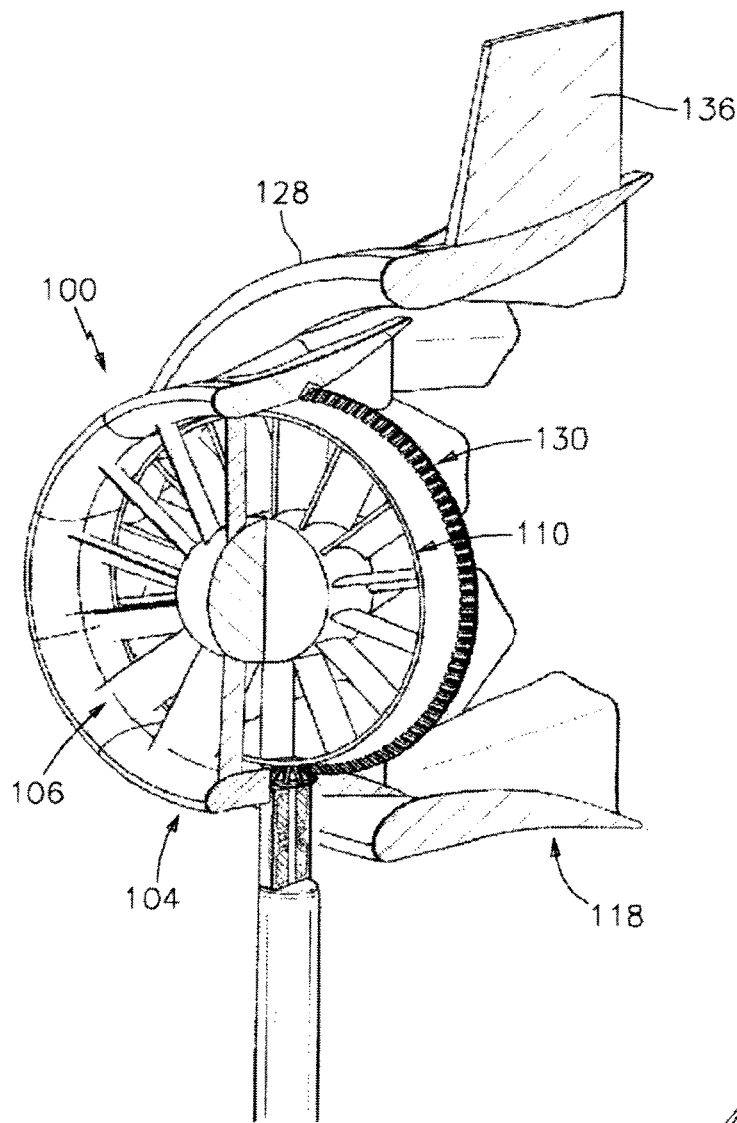
FIG. 4 is a front perspective view of a preferred MEWT with portions broken away to show interior structure, such as a power takeoff in the form of a wheel-like structure attached to the impeller.
Figure 5:
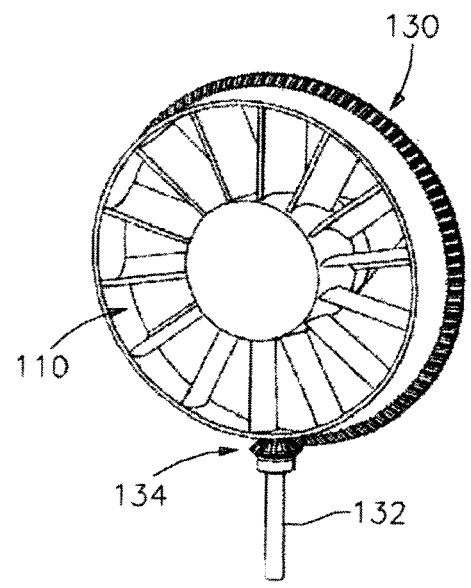
FIG. 5 is a front perspective view of just the stator, impeller, power takeoff, and support shaft from FIG. 4.

Based on their theoretical analysis, Applicants believe their preferred MEWT embodiment 100 will generate three times the existing power of the same size conventional wind turbine (shown in FIG. 1).

In simplistic terms, the preferred embodiment 100 of the MEWT comprises: an axial flow turbine (e.g., stator vanes and impeller blades) surrounded by an aerodynamically contoured turbine shroud 102 incorporating mixing devices in its terminus region (i.e., end portion); and a separate ejector shroud (e.g., 128) overlapping, but aft, of turbine shroud 102, which itself may incorporate advanced mixing devices (e.g., mixer lobes) in its terminus region. Applicants' ring 118 of mixer lobes (e.g., 120*a*) combined with the ejector shroud 128 can be thought of as a mixer/ejector pump. This mixer/ejector pump provides the means for consistently exceeding the Betz limit for operational efficiency of the wind turbine.

Applicants have also presented supplemental information for the preferred embodiment 100 of MEWT shown in FIGS. 2A, 2B. It comprises a turbine stage 104 (i.e., with a stator ring 106 and an impeller 110) mounted on center body 103, surrounded by turbine shroud 102 with embedded mixer lobes (e.g., 120*a*) having trailing edges inserted slightly in the entrance plane of ejector shroud 128. The turbine stage 104 and ejector shroud 128 are structurally connected to the turbine shroud 102, which itself is the principal load carrying member.

The length of the turbine shroud 102 is equal or less than the turbine shroud's outer maximum diameter. The length of the ejector shroud 128 is equal or less than the ejector shroud's outer maximum diameter. The exterior surface of the center body 103 is aerodynamically contoured to minimize the effects of flow separation downstream of the MEWT 100. It may be longer or shorter than the turbine shroud 102 or the ejector shroud 128, or their combined lengths.

The turbine shroud's entrance area and exit area will be equal to or greater than that of the annulus occupied by the turbine stage 104, but need not be circular in shape so as to allow better control of the flow source and impact of its wake. The internal flow path cross-sectional area formed by the annulus between the center body 103 and the interior surface of the turbine shroud 102 is aerodynamically shaped to have a minimum area at the plane of the turbine and to otherwise vary smoothly from their respective entrance planes to their exit planes. The turbine and ejector shrouds' external surfaces are aerodynamically shaped to assist guiding the flow into the turbine shroud inlet, eliminating flow separation from their surfaces, and delivering smooth flow into the ejector entrance 129. The ejector 128 entrance area, which may be noncircular in shape (see, e.g., FIG. 25), is larger than the mixer 118 exit plane area and the ejector's exit area may also be noncircular in shape.

Optional features of the preferred embodiment 100 can include: a power take-off 130 (see FIGS. 4 and 5), in the form of a wheel-like structure, which is mechanically linked at an outer rim of the impeller 110 to a power generator (not shown); a vertical support shaft 132 with a rotatable coupling at 134 (see FIG. 5), for rotatably supporting the MEWT 100, which is located forward of the center-of-pressure location on the MEWT for self-aligning the MEWT; and a self-moving vertical stabilizer or "wing-tab" 136 (see FIG. 4), affixed to upper and lower surfaces of ejector shroud 128, to stabilize alignment directions with different wind streams.

MEWT 100, when used near residences can have sound absorbing material 138 affixed to the inner surface of its shrouds 102, 128 (see FIG. 24) to absorb and thus eliminate the relatively high frequency sound waves produced by the interaction of the stator 106 wakes with the impeller 110. The MEWT can also contain safety blade containment structure (not shown)

Figure 14:
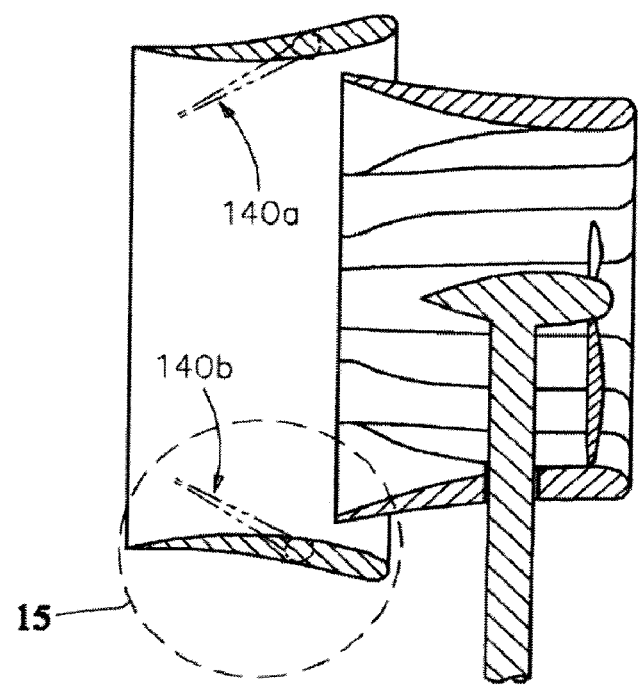
FIG. 14 is a side cross-sectional view, taken along sight line 14-14 of FIG. 13, showing two pivotable blockers for flow control.
Figure 15:
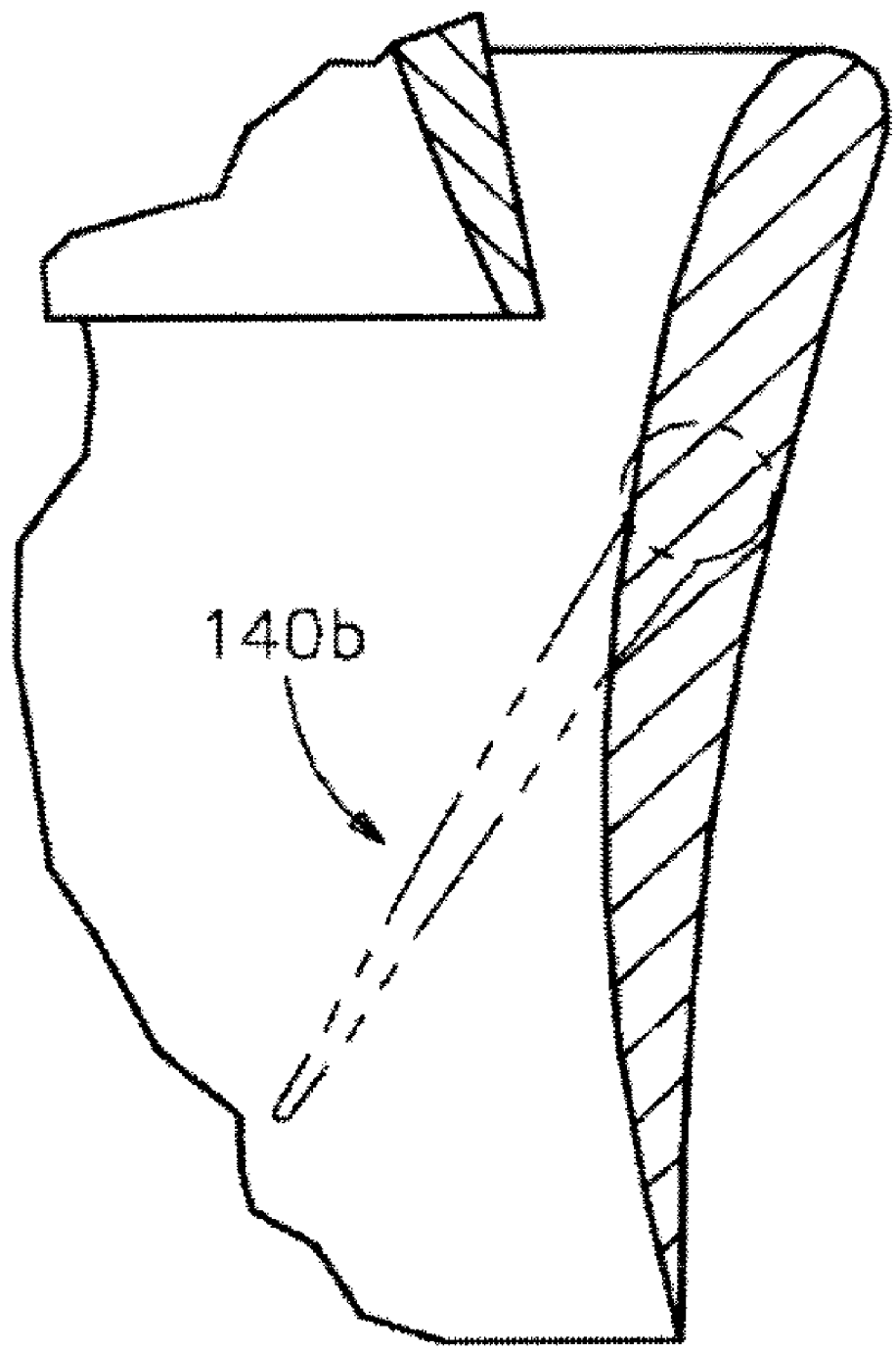
FIG. 15 is a close-up of an encircled blocker in FIG. 14.
Figure 16:
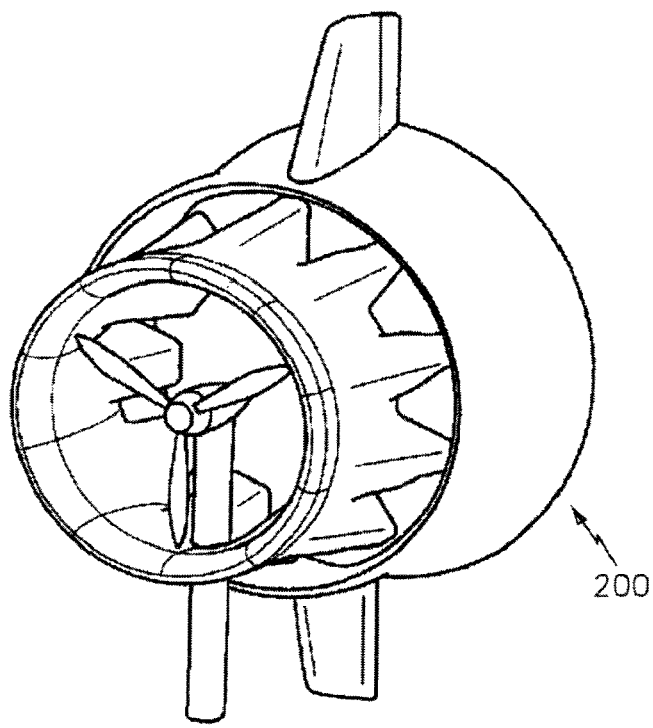
FIG. 16 illustrates an alternate embodiment of an MEWT with two optional pivoting wing-tabs for wind alignment.
Figure 17:
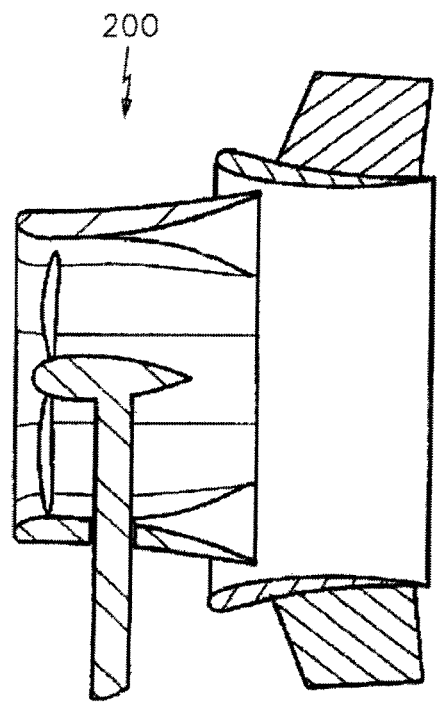
FIG. 17 is a side cross-sectional view of the MEWT of FIG. 16.
Figures 18, 19:
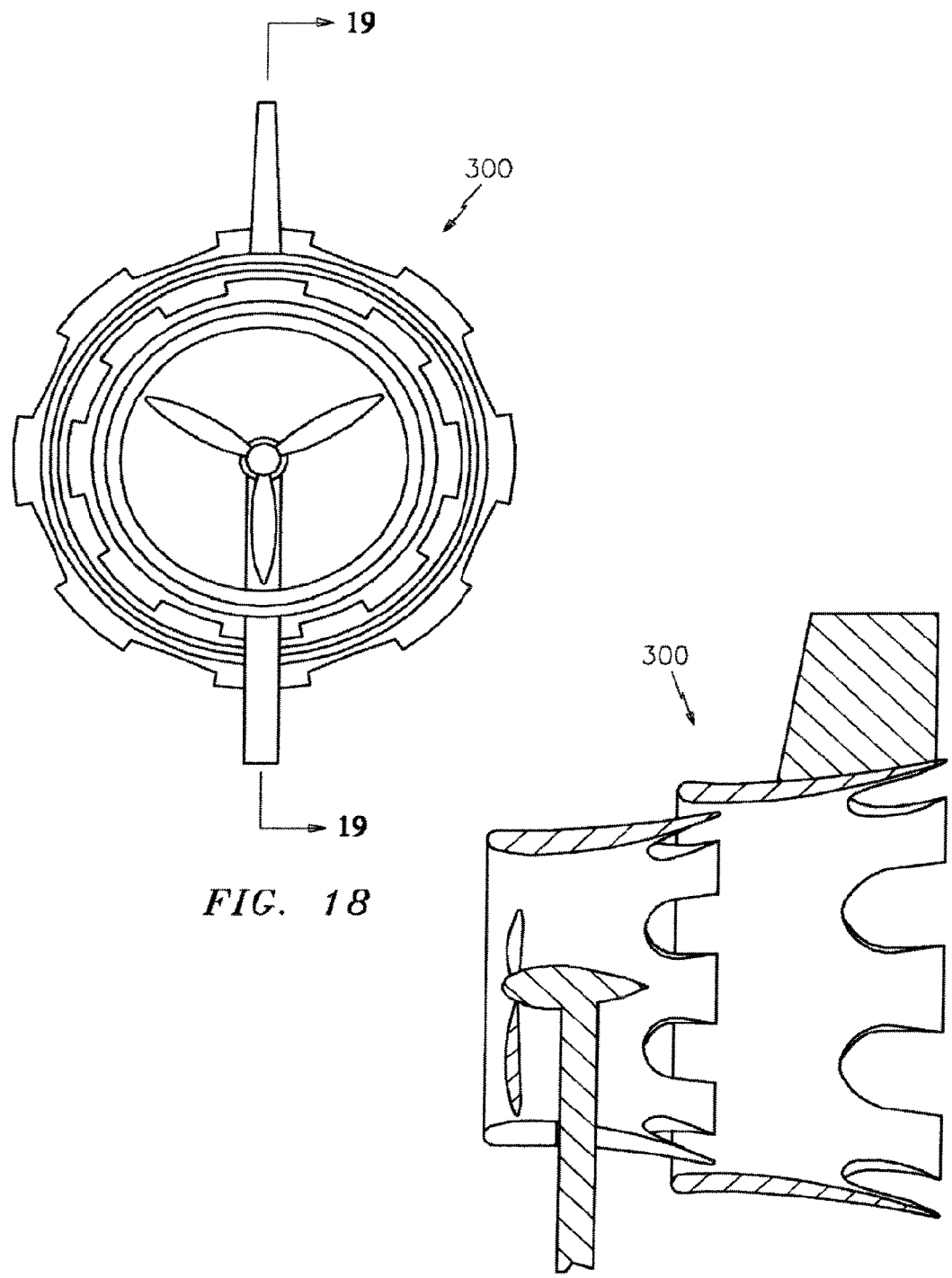
FIG. 18 is a front plan view of an alternate embodiment of the MEWT incorporating a two-stage ejector with mixing devices (here, a ring of slots) in the terminus regions of the turbine shroud (here, mixing lobes) and the ejector shroud.
FIG. 19 is a side cross-sectional view of the MEWT of FIG. 18.
Figure 20:
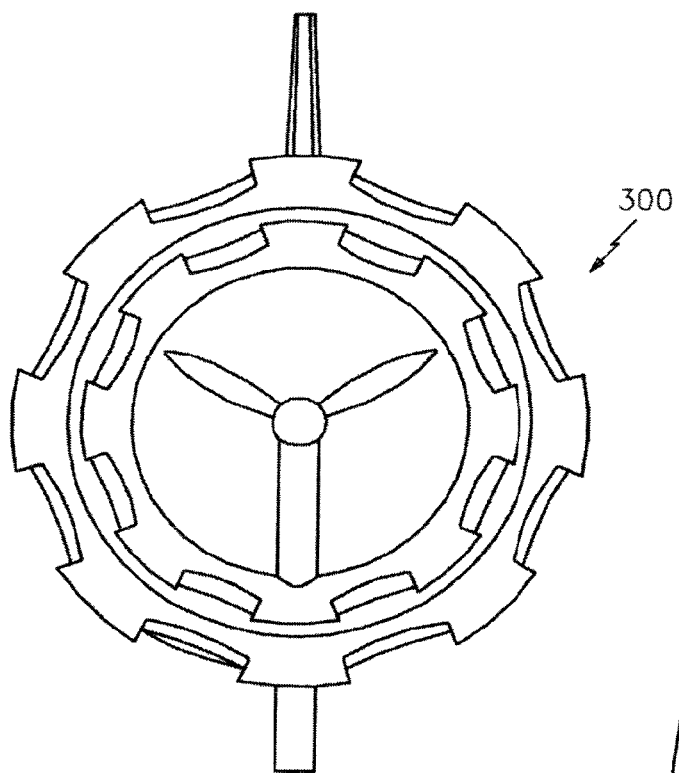
FIG. 20 is a rear view of the MEWT of FIG. 18.
Figure 21:
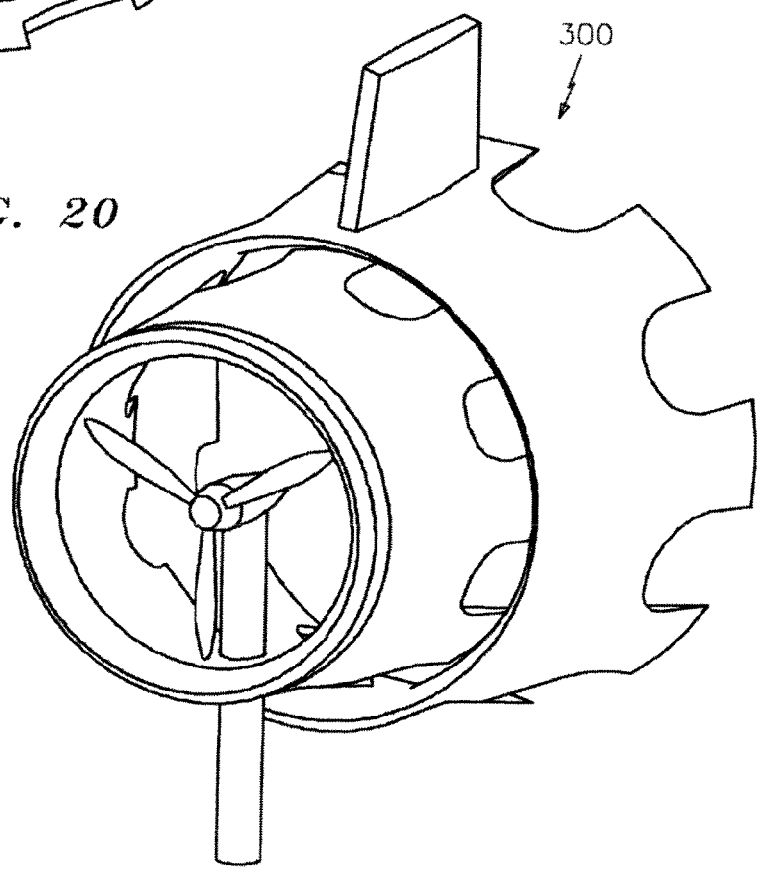
FIG. 21 is a front perspective view of the MEWT of FIG. 18.
Figure 22:
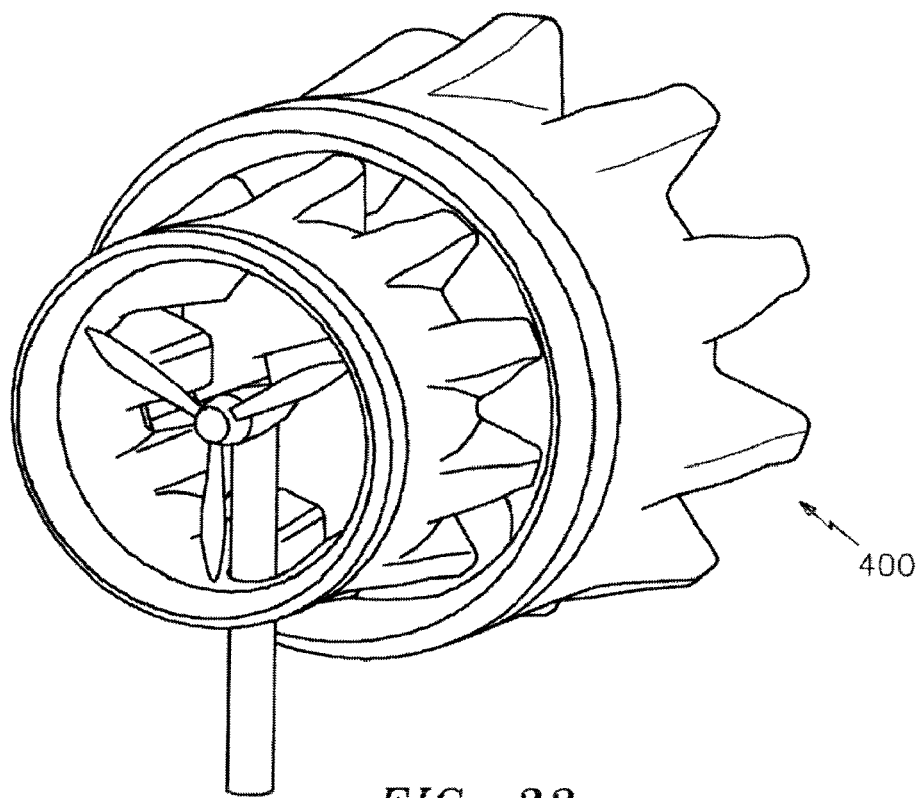
FIG. 22 is a front perspective view of an alternate embodiment of the MEWT incorporating a two-stage ejector with mixing lobes in the terminus regions of the turbine shroud and the ejector shroud.
Figure 23:
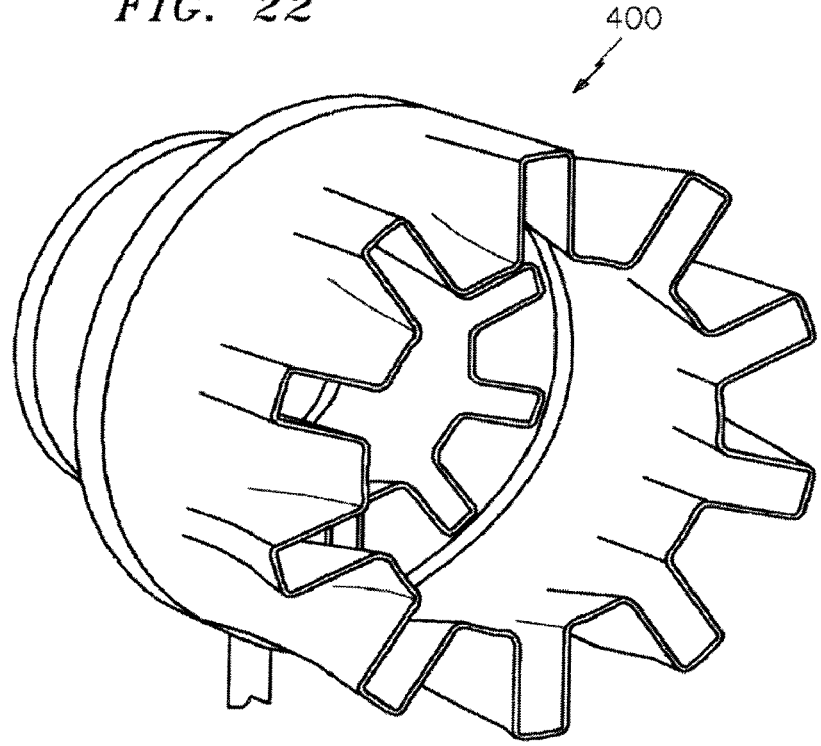
FIG. 23 is a rear perspective view of the MEWT of FIG. 22.
Figure 24:
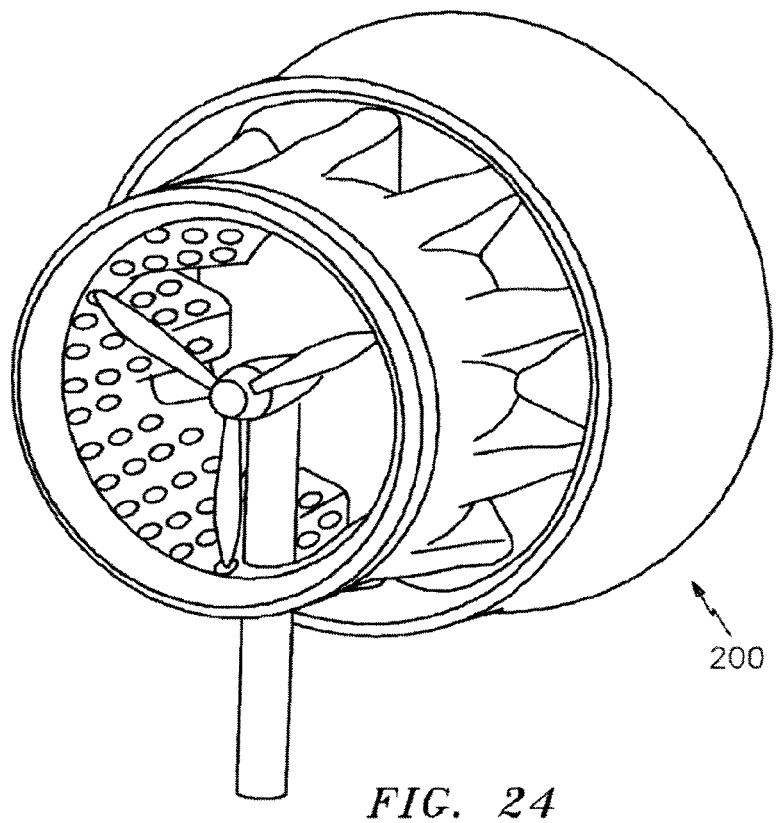
FIG. 24 shows optional acoustic lining within the turbine shroud of FIG. 22.
Figure 25:
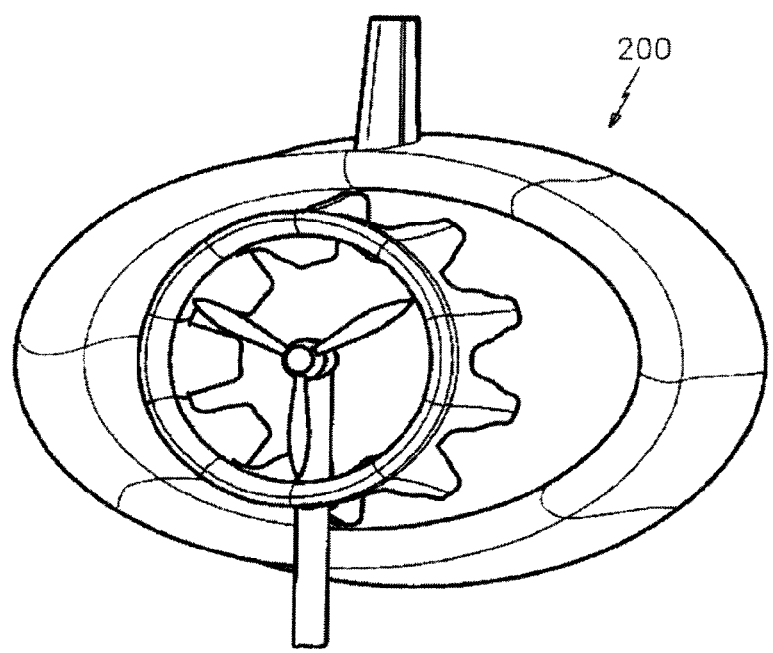
FIG. 25 shows a MEWT with a noncircular shroud component.
Figure 26:
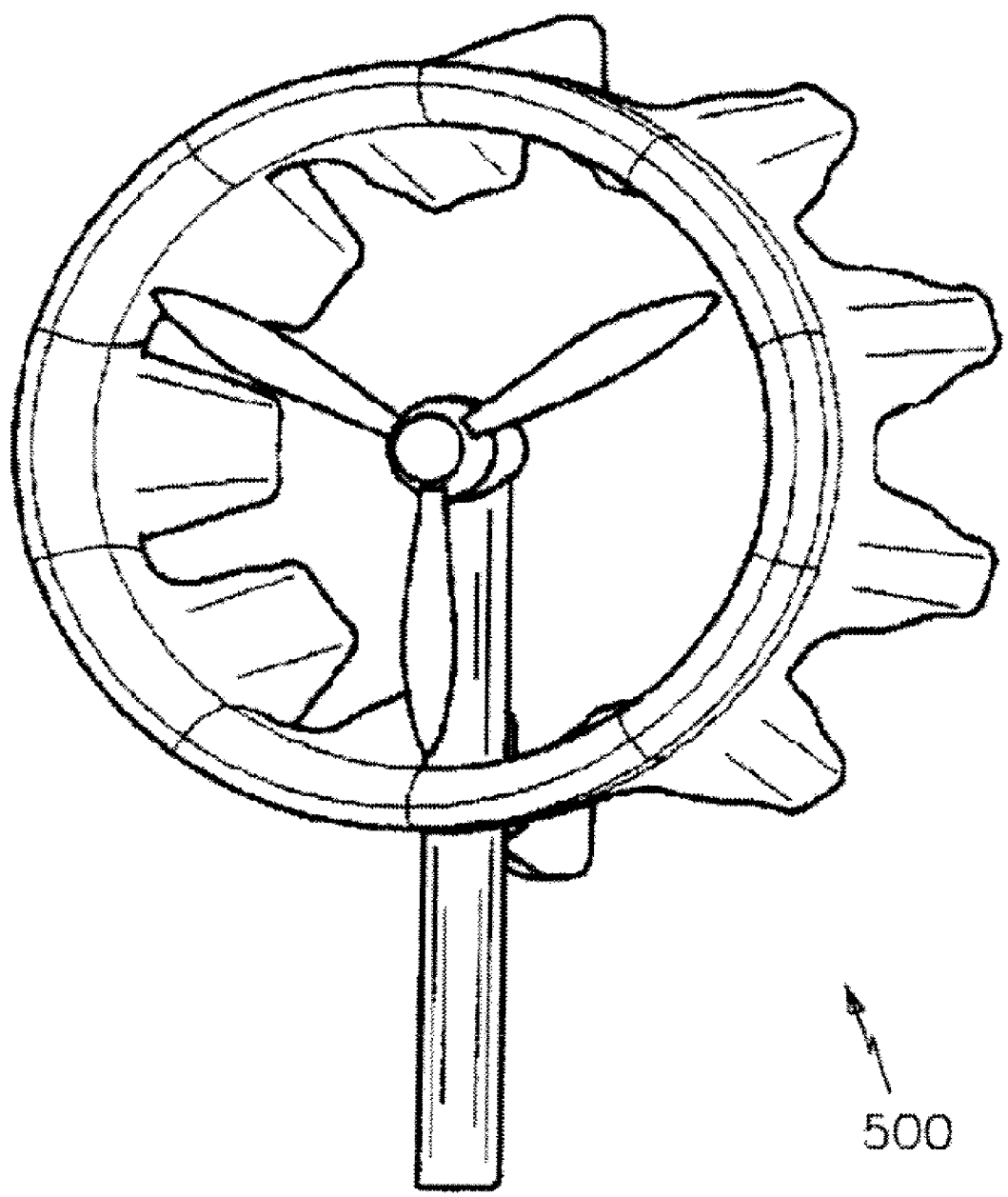
FIG. 26 shows an alternate embodiment of the preferred MEWT with mixer lobes on the terminus region (i.e., an end portion) of the turbine shroud.

FIGS. 14, 15 show optional flow blockage doors 140*a*, 140*b*. They can be rotated via linkage (not shown) into the flow stream to reduce or stop flow through the turbine 100 when damage, to the generator or other components, due to high flow velocity is possible.

Figure 8:
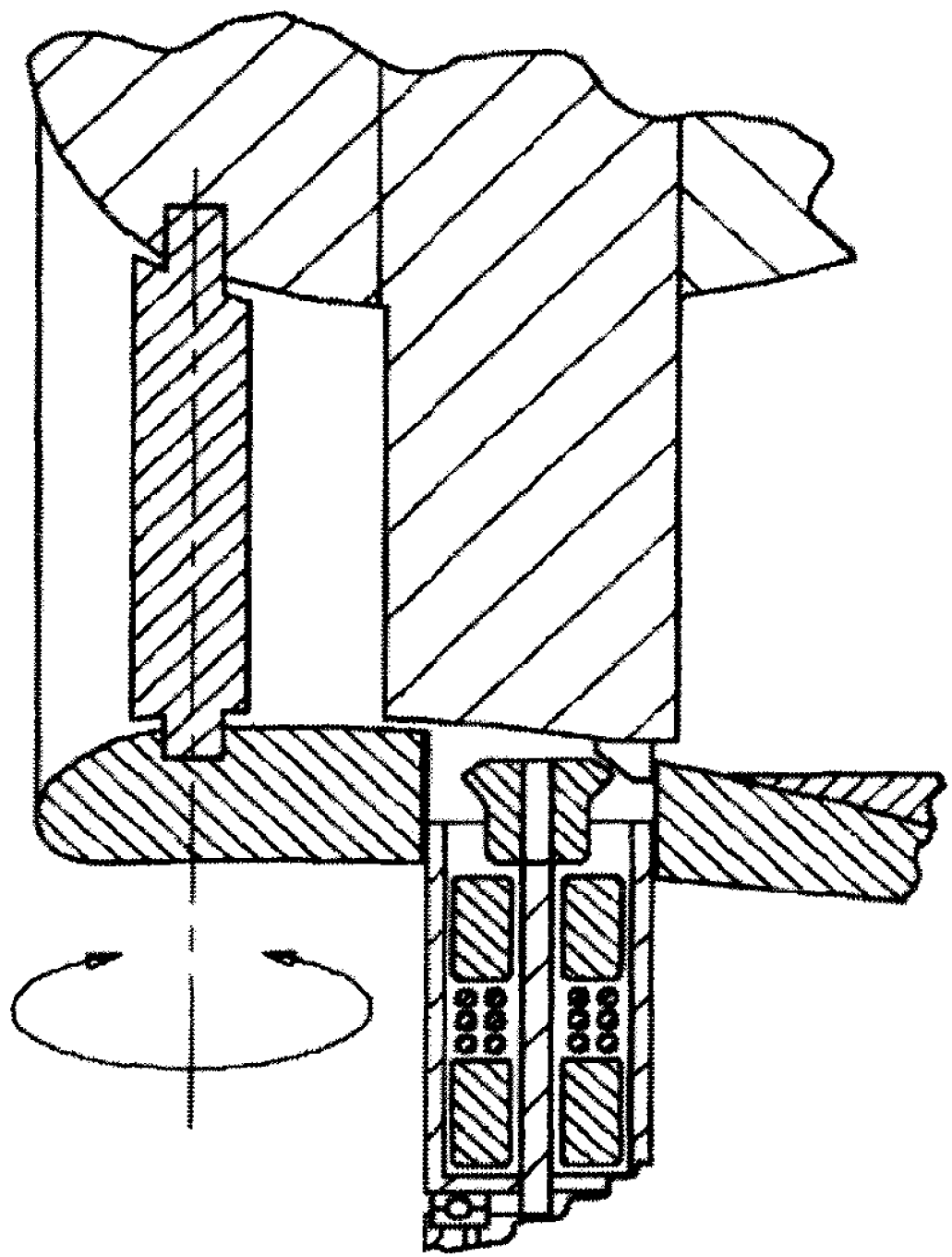
FIG. 8 is a close-up of a rotatable coupling (encircled in FIG. 7), for rotatably attaching the MEWT to a support tower, and a mechanical rotatable stator blade variation.
Figure 9:
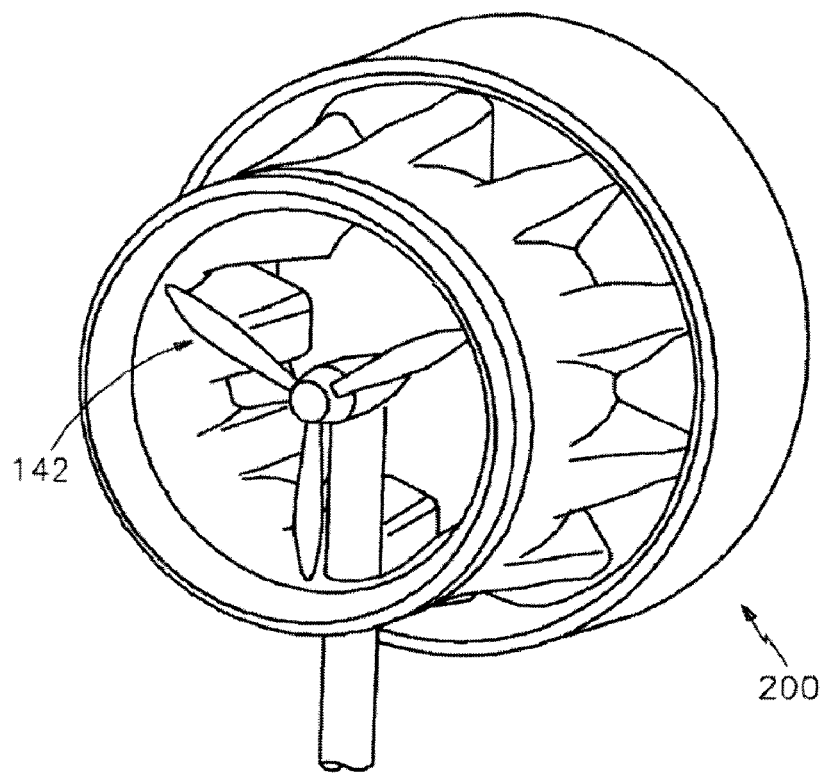
FIG. 9 is a front perspective view of an MEWT with a propeller-like rotor.
Figure 10:
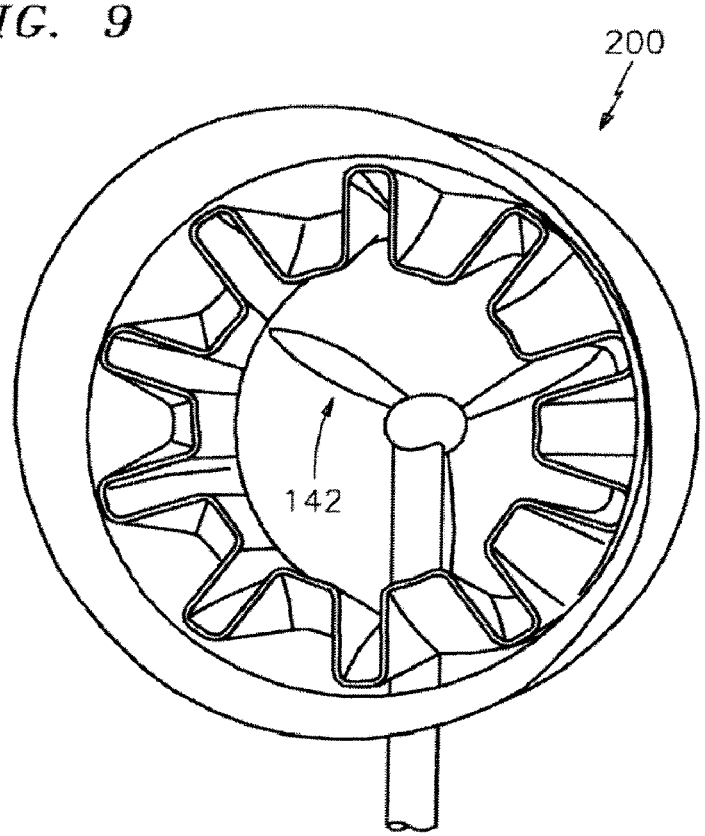
FIG. 10 is a rear perspective view of the MEWT of FIG. 9.
Figure 11:
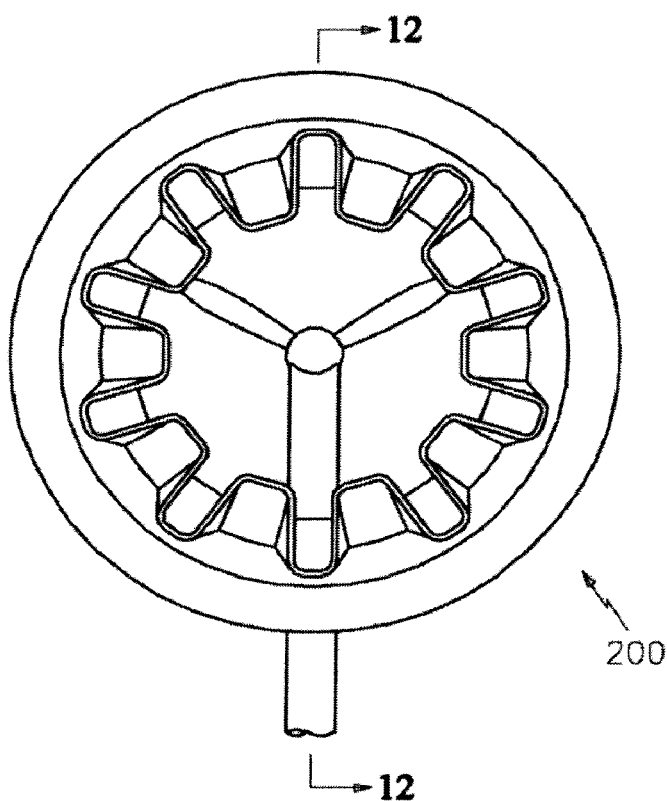
FIG. 11 shows a rear plan view of the MEWT of FIG. 9.
Figure 12:
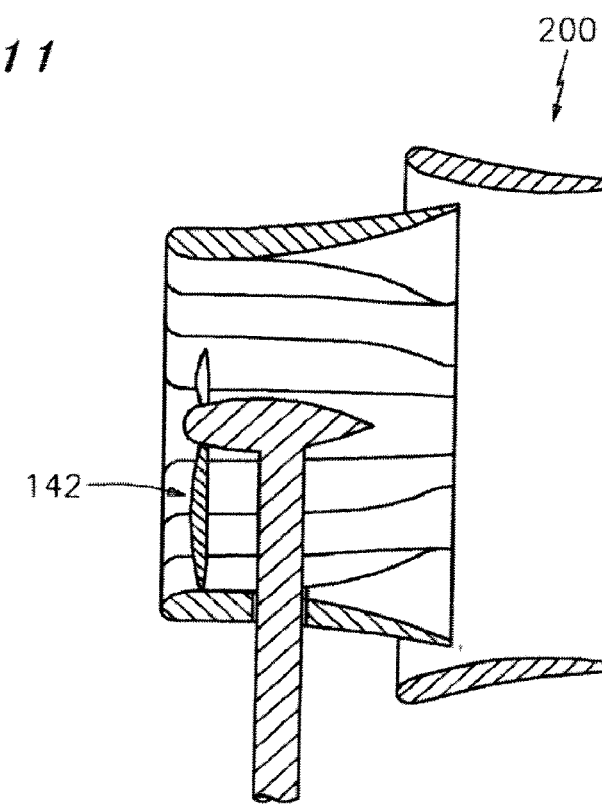
FIG. 12 is a cross-sectional view taken along sight line 12-12 of FIG. 11.
Figure 13:
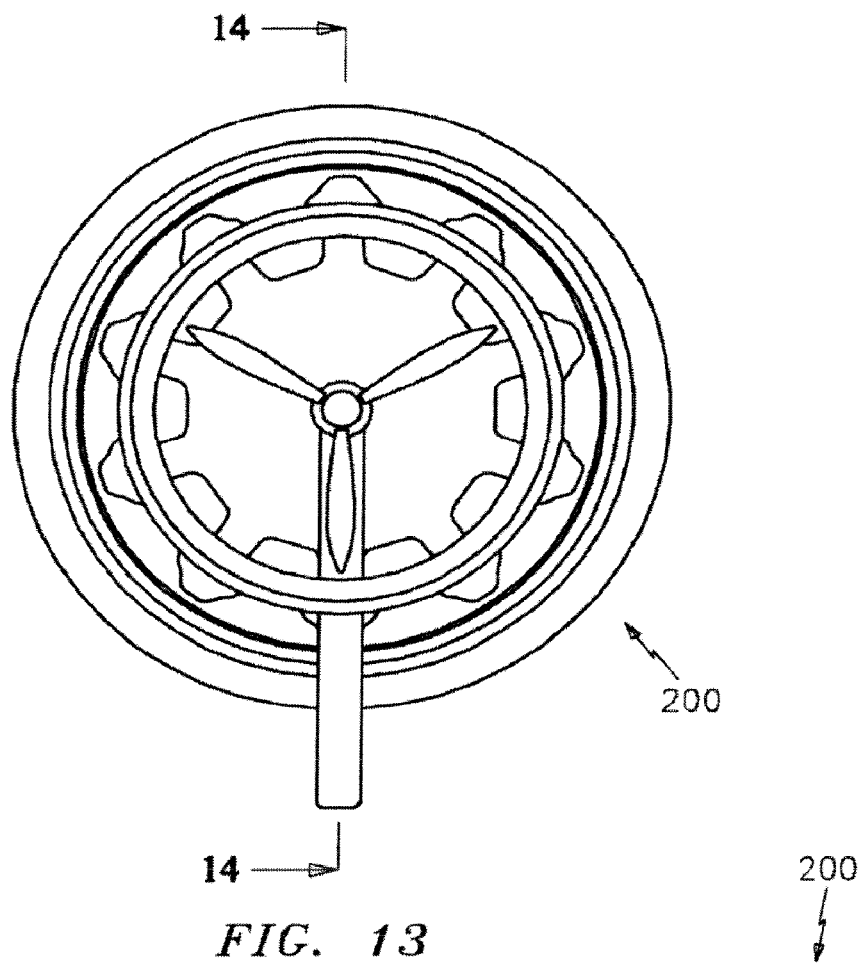
FIG. 13 is a front plan view of the MEWT of FIG. 9.

FIG. 8 presents another optional variation of Applicants' preferred MEWT 100. The stator vanes' exit-angle incidence is mechanically varied in situ (i.e., the vanes are pivoted) to accommodate variations in the fluid stream velocity so as to assure minimum residual swirl in the flow exiting the rotor.

Note that Applicants' alternate MEWT embodiments, shown in FIGS. 9-23 and 26, each use a propeller-like rotor (e.g., 142 in FIG. 9) rather than a turbine rotor with a ring of impeller blades. While perhaps not as efficient, these embodiments may be more acceptable to the public.

Applicants' alternate MEWT embodiments are variations 200, 300, 400, 500 containing zero (see, e.g., FIG. 26), one- and two-stage ejectors with mixers embedded in the terminus regions (i.e., end portions) of the ejector shrouds, if any. See, e.g., FIGS. 18, 20, and 22 for mixers embedded in the terminus regions of the ejector shrouds. Analysis indicates such MEWT embodiments will more quickly eliminate the inherent velocity defect occurring in the wake of existing wind turbines and thus reduce the separation distance required in a wind farm to avoid structural damage and/or loss of productivity.

Figure 6:
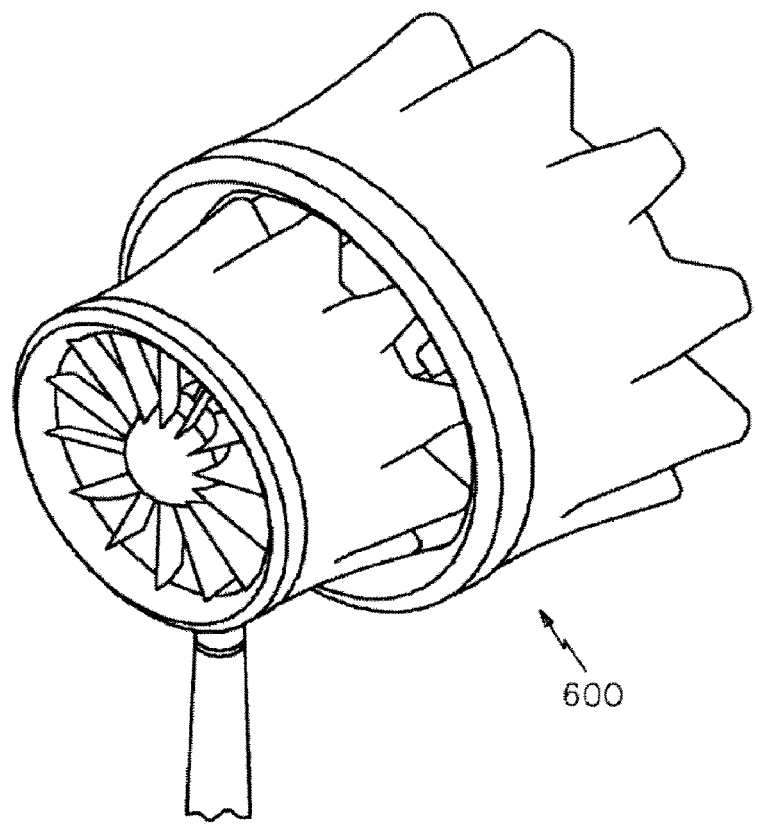
FIG. 6 is an alternate embodiment of the preferred MEWT with a mixer/ejector pump having mixer lobes on the terminus regions (i.e., an end portion) of the ejector shroud.

FIG. 6 shows a "two-stage" ejector variation 600 of the pictured embodiment 100 having a mixer at the terminus region of the ejector shroud.

The ejector design concepts described herein can significantly enhance fluid dynamic performance. The basic concept is as depicted in FIG. 32(a) through 32(d) and involves the use of convoluted lobed-mixers to enhance the flow through single and multi-stage ejectors. These mixer-ejector systems provide numerous advantages over conventional systems with and without ejectors, such as: shorter ejector lengths; increased mass flow into and through the system; lower sensitivity to inlet flow blockage and/or misalignment with the principal flow direction; reduced aerodynamic noise; added thrust; and increased suction pressure at the primary exit.

A Mixer-Ejector Power System (MEPS) can provide the following unique benefits over existing systems:
- an improved means of: generating power from wind or water currents;
- a more effective and efficient wind power generating system;
- a wind power generating system that significantly increases the maximum power extraction potential;
- a quieter, cheaper, and/or more durable wind power system;
- a wind power system that operates more effectively in low wind speeds;
- a wind power system that is more acceptable esthetically for urban and suburban settings;
- a wind power system that reduces bird strikes;
- a wind power system that reduces the requirement of expensive internal gearing;
- a wind power system that reduces the need for turbine blade replacements caused by high winds and wind gusts;
- a wind power system that employs advanced turbine aerodynamic designs to create more compact and structurally robust design;
- a wind power system that is less sensitive to inlet flow blockage and/or alignment of the turbine axis with the wind direction;
- a wind power system that uses advanced aerodynamics to automatically align with the wind direction;
- a more effective and efficient water power generating system;
- a water power generating system that significantly increases the maximum power extraction potential over other systems;
- a cheaper water power system;
- a more durable water power system;
- a water power system that operates more effectively in low water speeds;
- a water power system that reduces the need for turbine blade replacements caused by water surges;
- a water power system that employs advanced turbine aerodynamic designs to create a more compact and structurally robust design;
- a water power system that is less sensitive to inlet flow blockage and/or alignment of the turbine axis with the water flow direction;
- a water power system that automatically aligns with the water flow direction.

It should be understood by those skilled in the art that modifications can be made without departing from the spirit or scope of the invention. For example, slots could be used instead of the mixer lobes or the ejector lobes. In addition, no blocker arm is needed to meet or exceed the Betz limit. Accordingly, reference should be made primarily to the appended claims rather than the foregoing description.

We claim:

1. A method of increasing energy extraction from a fluid stream, comprising:
   providing a horizontal axis wind turbine supported by a vertical support shaft, the wind turbine comprising:
   an aerodynamically contoured turbine shroud with an inlet, an outlet, and a ring of mixer lobes arranged along a trailing edge;
   a means for extracting energy from a fluid stream, the means for extracting energy being positioned within the turbine shroud; and
   an elector shroud having an inlet and an outlet, the ejector shroud being located downstream of the turbine shroud;
   wherein the turbine shroud defines a (i) primary fluid stream that passes though the means for extracting energy and (ii) a secondary fluid stream that bypasses the means for extracting energy and enters the ejector shroud inlet;
   placing the wind turbine in contact with the primary fluid stream;
   extracting energy from the primary fluid stream to produce power and to form a reduced-energy fluid stream; and
   mixing the reduced-energy fluid stream with the secondary fluid stream to transfer energy from the secondary fluid stream to the reduced-energy fluid stream, thereby enhancing the flow volume of the primary fluid stream passing through the fluid turbine and increasing the amount of energy extracted.

2. The method of claim 1, wherein each mixer lobe has an inner trailing edge angle and an outer trailing edge angle, the inner angle being different from the outer angle.

3. The method of claim 2, wherein the inner angle is greater than the outer angle.

4. The method of claim 2, wherein the inner angle is less than the outer angle.

5. The method of claim 2, wherein the inner angle and the outer angle are independently in the range of 5 to 25 degrees.

6. The method of claim 1, wherein each mixer lobe has an inner trailing edge angle and an outer trailing edge angle, the inner angle being equal to the outer angle.

7. The method of claim 1, wherein the ejector shroud further comprises a ring of mixer lobes around the ejector shroud outlet.

8. The method of claim 1, wherein the means for extracting energy comprises a ring of stator vanes upstream from a ring of impeller blades, wherein the stator vanes can be mechanically rotated to better align the stator exit flow with the impeller blades at all operating conditions.

9. The method of claim 8, wherein the impeller is connected to a power takeoff in the form of a wheel-like structure around the impeller.

10. The method of claim 1, wherein the means for extracting energy comprises a stator ring and a rotor.

11. A method of increasing energy extraction from a fluid stream, comprising:
    providing a horizontal axis wind turbine supported by a vertical support shaft, the wind turbine defining a turbine axis and comprising:
    an aerodynamically contoured turbine shroud with an inlet, an outlet, and a ring of mixer lobes arranged along a trailing edge;

a means for extracting energy from a fluid stream, the means for extracting energy being positioned within the turbine shroud; and an ejector shroud having an inlet and an outlet, the ejector shroud being located downstream of the turbine shroud;

wherein the turbine shroud defines a (i) primary fluid stream that passes though the means for extracting energy and (ii) a secondary fluid stream that bypasses the means for extracting energy and enters the ejector shroud inlet;

disposing the turbine in a fluid stream to define a primary fluid stream within the turbine shroud and a bypass fluid stream outside the turbine shroud that passes through the ejector shroud inlet;

extracting energy from the primary fluid stream with the means for extracting energy;

directing the bypass fluid stream toward the turbine axis and directing the primary fluid stream exiting the turbine stage away from the turbine axis, effecting energy transfer from the bypass fluid stream to the primary fluid stream, thereby enhancing the flow volume of the primary fluid stream and increasing energy extraction.

12. The method of claim 11, wherein each mixer lobe has an inner trailing edge angle and an outer trailing edge angle, the inner angle being different from the outer angle.

13. The method of claim 12, wherein the inner angle is greater than the outer angle.

14. The method of claim 12, wherein the inner angle is less than the outer angle.

15. The method of claim 12, wherein the inner angle and the outer angle are independently in the range of 5 to 25 degrees.

16. The method of claim 12, wherein the inner angle is equal to the outer angle.

17. A method of enhancing energy extracted from a fluid stream, comprising:

providing a horizontal axis wind turbine supported by a vertical support shaft, the wind turbine comprising:

an aerodynamically contoured turbine shroud with an inlet, an outlet, and a ring of mixer lobes arranged along a trailing edge;

a means for extracting energy from a fluid stream, the means for extracting energy being positioned within the turbine shroud; and an elector shroud having an inlet and an outlet, the ejector shroud being located downstream of the turbine shroud;

wherein the turbine shroud defines a (i) first fluid stream that passes though the means for extracting energy and (ii) a second fluid stream that bypasses the means for extracting energy and enters the ejector shroud inlet;

extracting energy from the first fluid stream to form a reduced-energy fluid stream;

mixing the reduced-energy fluid stream with the second fluid stream downstream of the turbine shroud to permit the formation of a reduced pressure area, the reduced pressure area causing entrainment of additional fluid through the wind turbine.

* * * * *